United States Patent
Van Der Auwera et al.

(10) Patent No.: US 9,008,175 B2
(45) Date of Patent: Apr. 14, 2015

(54) INTRA SMOOTHING FILTER FOR VIDEO CODING

(75) Inventors: Geert Van Der Auwera, San Diego, CA (US); Xianglin Wang, San Diego, CA (US); Muhammed Zeyd Coban, San Diego, CA (US); Marta Karczewicz, San Diego, CA (US); Yunfei Zheng, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 378 days.

(21) Appl. No.: 13/248,968

(22) Filed: Sep. 29, 2011

(65) Prior Publication Data

US 2012/0082224 A1  Apr. 5, 2012

Related U.S. Application Data

(60) Provisional application No. 61/389,173, filed on Oct. 1, 2010, provisional application No. 61/406,046, filed on Oct. 22, 2010, provisional application No. 61/426,388, filed on Dec. 22, 2010, provisional (Continued)

(51) Int. Cl.
*H04N 7/015* (2006.01)
*H04N 19/85* (2014.01)

(Continued)

(52) U.S. Cl.
CPC ............. *H04N 19/85* (2014.11); *H04N 19/176* (2014.11); *H04N 19/147* (2014.11); *H04N 19/46* (2014.11);

(Continued)

(58) Field of Classification Search
CPC ............................ H04N 19/176; H04N 19/147
USPC ............................ 375/240.12, 240.24, 240.29
See application file for complete search history.

(56) References Cited

U.S. PATENT DOCUMENTS 7,349,473 B2   3/2008   Hallapuro et al.
7,555,043 B2   6/2009   Sato et al.

(Continued)

FOREIGN PATENT DOCUMENTS

EP   1677544        7/2006
EP   1720358 A2   11/2006

(Continued)

OTHER PUBLICATIONS

Anonymous: "Test Model under Consideration ", 2. JCT-VC Meeting; Jul. 21, 2010-Jul. 28, 2010; Geneva; (Joint Collaborativeteam on Video Coding of 1SO/IEC JCT/SC29/WG11 and ITU-T SG.16 ); URL: http ://wftp3. itu. int/av-arch/jctvc- site/, No. JCTVC-B205, Jul. 28, 2010, XP030007704.

(Continued)

*Primary Examiner* — Tung Vo
*Assistant Examiner* — Rowina Cattungal
(74) *Attorney, Agent, or Firm* — Shumaker & Sieffert, P.A.

(57) ABSTRACT

This disclosure relates to techniques for reducing the amount of additional data encoded with a block encoded using intra-predictive coding. Particularly, the techniques provide apparatus and methods of applying a smoothing filter to prediction samples used in intra-predictive coding. For example, in fixed mode-dependent intra-predictive coding, a video encoder may determine the type of smoothing filter applied to prediction samples based on block size and intra-prediction mode combination associated with the current block, where the combination is used to look up a filter in a first filter table. In adaptive mode-dependent intra-predictive coding, the encoder uses two filters, one from the first filter table and another from a second filter table, applies both filters, and determines which yields better results. When the second filter table filter yields better results, the encoder encodes a filtering indication. When a filter from the first filter table is used, no filtering indication is encoded.

43 Claims, 10 Drawing Sheets

Related U.S. Application Data application No. 61/426,964, filed on Dec. 23, 2010, provisional application No. 61/492,335, filed on Jun. 1, 2011, provisional application No. 61/499,579, filed on Jun. 21, 2011, provisional application No. 61/500,095, filed on Jun. 22, 2011.

(51) Int. Cl.

| | |
|---|---|
| H04N 19/176 | (2014.01) |
| H04N 19/147 | (2014.01) |
| H04N 19/46 | (2014.01) |
| H04N 19/593 | (2014.01) |
| H04N 19/117 | (2014.01) |
| H04N 19/157 | (2014.01) |
| H04N 19/82 | (2014.01) |

(52) U.S. Cl.
CPC ........... *H04N 19/593* (2014.11); *H04N 19/117* (2014.11); *H04N 19/157* (2014.11); *H04N 19/82* (2014.11)

(56) References Cited

U.S. PATENT DOCUMENTS

| | | | |
|---|---|---|---|
| 7,706,622 B2 | 4/2010 | Kobayashi | |
| 8,005,151 B2 * | 8/2011 | Joch et al. | 375/240.29 |
| 2004/0136458 A1 | 7/2004 | Dahlhoff et al. | |
| 2006/0072676 A1 | 4/2006 | Gomila | |
| 2006/0268991 A1 * | 11/2006 | Segall et al. | 375/240.24 |
| 2010/0080472 A1 | 4/2010 | Asano | |
| 2010/0135389 A1 * | 6/2010 | Tanizawa et al. | 375/240.12 |
| 2010/0239002 A1 | 9/2010 | Park et al. | |
| 2011/0038415 A1 * | 2/2011 | Min et al. | 375/240.12 |
| 2013/0177079 A1 * | 7/2013 | Kim et al. | 375/240.12 |

FOREIGN PATENT DOCUMENTS

| | | |
|---|---|---|
| JP | 2005512419 A | 4/2005 |
| JP | 2006229411 A | 8/2006 |
| JP | 2012138884 A | 7/2012 |
| JP | 2013534384 A | 9/2013 |
| JP | 2013534797 A | 9/2013 |
| JP | 2013537771 A | 10/2013 |
| WO | WO2011127964 A2 | 10/2011 |
| WO | 2011158657 A1 | 12/2011 |
| WO | 2012009540 A1 | 1/2012 |
| WO | 2012096150 A1 | 7/2012 |

OTHER PUBLICATIONS

Bossen, "Common test conditions and software reference configurations," JCT-VC, Document: JCTVC-B300, 2nd Meeting: Geneva, CH, Jul. 21-28, 2010.

Bross, "TE12.3: Adaptive intra smoothing (AIS) test (slow vs. fast) by Fraunhofer HHI," JCT-VC, Document: JCTVC-C053, WG11 No. m18074, 3rd Meeting: Guangzhou, CN, Oct. 7-15, 2010.

Davies et al., "Suggestion for a Test Model," Document JCTVC-A033, 1st meeting: Dresden, DE, Apr. 15-23, 2010, 30 pp.

Huang, et al., "Fast Decision of Block Size, Prediction Mode, and Intra Block for H.264 Intra Prediction," IEEE Transactions on Circuits and Systems for Video Technology, vol. 20, No. 8, pp. 1122-1132, Aug. 2010.

International Search Report and Written Opinion—PCT/US2011/054130—ISA/EPO—Nov. 22, 2011.

ITU-T, H.264, "Series H: Audiovisual and Multimedia Systems, Infrastructure of audiovisual services—Coding of moving video, Advanced video coding for generic audiovisual services," Mar. 2010.

ITU-T, Recommendation, H.264, "Series H: Audiovisual and Multimedia Systems, Infrastructure of audiovisual services—Coding of moving video, Advanced video coding for generic audiovisual services," Nov. 2007.

JCT-VC, "Test Model under Consideration (output Document draft007)," Document: JCTVC-B205, 2nd Meeting: Geneva, CH, Jul. 21-28, 2010.

Jeong, et al., "A directional deblocking filter based on intra prediction for H.264/AVC," IEICE Electronics Express, vol. 6, No. 12, pp. 864-869, year 2009.

Kim, et al., "Tool Experiment 9: Large Block Structure," JCT-VC, Document: JCTVC-8309, 2nd Meeting: Geneva, CH, Jul. 21-28, 2010.

McCann, et al., "Samsung's Response to the Call for Proposals on Video Compression Technology," Joint Collaborative Team on Video Coding (JCT-VC) of ITU-T SG-16 WP3 and ISO/IEC JTC1/SC29/WG11, 1st meeting, Document: JCTVC-A124, Dresden, DE, Apr. 15-23, 2010, 42 pp.

Winken, et al., "Description of video coding technology proposal by Fraunhofer HHI ", JCTVC-A116, Joint Collaborative Team on Video Coding (JCT-VC) of ITU-T SG16 WP3 and ISO/IEC JTC1/SC29/WG11, 1st Meeting: Dresden (Germany), Apr. 2010.

Zheng Y., et al., "Simplified intra smoothing", 94. MPEG Meeting; Oct. 11, 2010-Oct. 15, 2010; Guangzhou; (Motion Picture Expert Group or ISO/IEC JTC1/SC29/WG11), No. M18274, Oct. 28, 2010, XP030046864.

Office Action from corresponding Ukraine Application No. 201305699 dated Apr. 16, 2014, 2 pp.

Bross et al., "High efficiency video coding (HEVC) text specification draft 6," 8th Meeting: San Jose, CA, USA, Feb. 1-10, 2012, JCTVC-H1003, 259 pp.

Bross et al., "High efficiency video coding (HEVC) text specification draft 7," 9th Meeting: Geneva, CH, Apr. 27-May 7, 2012, JCTVC-I1003_d2, 290 pp.

Bross et al., "High efficiency video coding (HEVC) text specification draft 8," 10th Meeting: Stockholm, SE, Jul. 11-20, 2012, JCTVC-J1003_d7, 261 pp.

Bross et al., "WD4: Working Draft 4 of High-Efficiency Video Coding," 6th Meeting: JCTVC-F803_d2, Torino, IT, Jul. 14-22, 2011, 226 pp.

Bross et al., "WD5: Working Draft 5 of High-Efficiency Video Coding," 7th Meeting: Geneva, Switzerland, Nov. 21-30, 2011, JCTVC-G1103_d2, 214 pp.

ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.

Wiegand et al., "WD2: Working Draft 2 of High-Efficiency Video Coding," JCTVC-D503, 4th Meeting: Daegu, KR, Jan. 20-28, 2011, 153 pp.

Wiegand, T., et al., "WD3: Working Draft 3 of High-Efficiency Video Coding," Document JCTVC-E603, 5th Meeting: Geneva, CH, Mar. 16-23, 2011, pp. 193.

Wiegand et al., "WD1: Working Draft 1 of High-Efficiency Video Coding", JCTVC-C403, 3rd Meeting: Guangzhou, CN, Oct. 7-15, 2010, 137 pp.

International Preliminary Report on Patentability—PCT/US2011/054130, The International Bureau of WIPO—Geneva, Switzerland, Jan. 17, 2013.

Second Written Opinion from International Application No. PCT/US2011/054130, dated Oct. 5, 2012, 12 pp.

First Office Action from Japanese counterpart application No. 2013-531897, mailed Feb. 25, 2014, 11 pp.

Notice of Grounds for Rejection from Korean counterpart application No. 2013-7011347, dated Apr. 7, 2014, 11 pp.

Sekiguchi, "Trend Report on Video Coding Standardization: HEVC: Next-generation International Standardization Project", Electronic Information and Communication Engineers Technical report, Japan, Institute of Electronics, Information and Communication Engineers, Feb. 28, 2011, vol. 110, No. 455, ISSN: 0913-5685, 2 pp.

Sugimoto, et al., "LUT-based adaptive filtering on intra prediction samples", Joint Collaborative Team on Video Coding (JCT-VC) of ITU-T SG16 WP3 and ISO/IEC JTC1/SC29/WG11, Jan. 14, 2011, Document: JCTVC-D109, URL: http://phenix.int-evry.fr/jct/doc_end_user/documents/4_Daegu/wg11/JCTVC-D109-v1.zip, 4 pp.

Sugimoto, et al.,"CE6.f: verification report on LUT-based adaptive filtering on intra prediction samples", Joint Collaborative Team on

(56) References Cited

OTHER PUBLICATIONS

Video Coding (JCT-VC) of ITU-T SG16 WP3 and ISO/IEC JTCI/SC29/WG11, Mar. 10, 2011, Document: JCTVC-E069, URL, http://phenix.int.evry.fr/jct/doc_end_user/documents/5_Geneva/wg11/JCTVC-E069-v1zip, 6 pp.

Cao et al., "CE6.b1 Report on Short Distance Intra Prediction Method", Joint Collaborative Team on Video Coding (JCT-VC) of ITU-T SG16 WP3 and ISO/IEC JTC1/SC29/WG11, Mar. 16-23, 2011, Document: JCTVC-E278, URL, http://phenix.int-evry.fr/jct/doc_end_user/documents/5_Geneva/wg11/JCTVC-E278-v3.zip, 7 pp.

* cited by examiner

INTRA SMOOTHING FILTER FOR VIDEO CODING

This application claims the benefit of U.S. Provisional Application No. 61/389,173, filed Oct. 1, 2010, U.S. Provisional Application No. 61/406,046, filed Oct. 22, 2010, U.S. Provisional Application No. 61/426,388, filed Dec. 22, 2010, U.S. Provisional Application No. 61/426,964, filed Dec. 23, 2010, U.S. Provisional Application No. 61/492,335, filed Jun. 1, 2011, U.S. Provisional Application No. 61/499,579, filed Jun. 21, 2011, and U.S. Provisional Application No. 61/500, 095, filed Jun. 22, 2011, each of which is hereby incorporated by reference in its entirety.

TECHNICAL FIELD

This disclosure relates to video coding and, more particularly, to intra-prediction video coding.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by MPEG-2, MPEG-4, ITU-T H.263 or ITU-T H.264/MPEG-4, Part 10, Advanced Video Coding (AVC), and extensions of such standards, to transmit and receive digital video information more efficiently. New video standards, such as the High Efficiency Video Coding (HEVC) standard being developed by the "Joint Collaborative Team—Video Coding" (JCTVC), which is a collaboration between MPEG and ITU-T, continue to emerge and evolve. This new HEVC standard is also sometimes referred to as H.265.

Video compression techniques perform spatial prediction and/or temporal prediction to reduce or remove redundancy inherent in video sequences. For block-based video coding, a video frame or slice may be partitioned into blocks referred to as coding unit (CUs). In general, a CU has a similar purpose to a macroblock of the H.264 standard, except that a CU does not have a size distinction. CUs in an intra-coded (I) frame or slice are encoded using spatial prediction with respect to neighboring CUs in the same frame or slice. CUs in an inter-coded (P or B) frame or slice may use spatial prediction with respect to neighboring CUs in the same frame or slice or temporal prediction with respect to other reference frames.

SUMMARY

In general, this disclosure describes techniques for applying a smoothing filter to pixels surrounding prediction samples in intra-prediction coding of video data. Particularly, the techniques provide a method of determining and applying a smoothing filter to prediction samples used in intra-predictive coding. In some examples, the techniques may include selecting the smoothing filter to apply to the pixels surrounding prediction samples based on a combination of block size and intra-prediction mode associated with the current block.

In fixed mode-dependent intra-smoothing, a video encoder may determine the type of smoothing filter applied to the prediction samples based on the block size and intra-prediction mode combination associated with the current block. The block size and intra-prediction mode combination may be used to look up a filter in a filter table. In this case, there may be no overhead sent to the decoder to signal the filter type used for smoothing, as the filter table would be available at the decoder side and the block size and intra-prediction mode combination may be used in a similar manner on the decoder side.

In adaptive mode-dependent intra-smoothing, the video encoder may select the smoothing filter from two filter options, one from a first filter table and another from a second filter table, apply both filter, and determine which yields the better results. In this case, syntax indicative of the selected filter may be encoded with the video and sent to decoder to signal the selected filter type. In one example, if the filter from the second filter table yields better results, the video encoder encodes a filtering indication. When a filter from the first filter table is used, no filtering indication is encoded.

These techniques may reduce the amount of additional data encoded with a block encoded using intra-predictive coding and therefore, the amount of data transmitted to a decoder. A video decoder receiving intra-predictive encoded blocks may apply a smoothing filter during decoding using the first filter table, unless a filtering indication is encoded with the block. If the filtering indication is encoded with the block, then the video decoder may apply a smoothing filter during decoding using the filter that is indicated by the filtering indication.

In one example, the disclosure is directed to a method comprising determining a block size associated with a current block of video data, determining an intra-prediction coding mode associated with the current block, selecting a filter from a filter table to apply to the current block based on the block size and the coding mode, and intra-predictive coding the current block using the selected filter.

In another example, the disclosure is directed to an apparatus for coding video data, the apparatus comprising a processor configured to determine a block size associated with a current block of video data, determine an intra-prediction coding mode associated with the current block, select a filter from a filter table to apply to the current block based on the block size and the coding mode, and intra-predictive code the current block using the selected filter.

In another example, the disclosure is directed to an apparatus for encoding video data, the apparatus comprising means for determining a block size associated with a current block of video data, means for determining an intra-prediction coding mode associated with the current block, means for selecting a filter from a filter table to apply to the current block based on the block size and the coding mode, and means for intra-predictive coding the current block using the selected filter.

In a further example, the disclosure is directed toward a computer-readable storage medium comprising instructions for coding video data that, upon execution in a processor, cause the processor to determine a block size associated with a current block of video data, determine an intra-prediction coding mode associated with the current block, select a filter from a filter table to apply to the current block based on the block size and the coding mode, and intra-predictive code the current block using the selected filter.

The details of one or more examples are set forth in the accompanying drawings and the description below. Other features, objects, and advantages will be apparent from the description and drawings, and from the claims.

DETAILED DESCRIPTION

Figure 1:
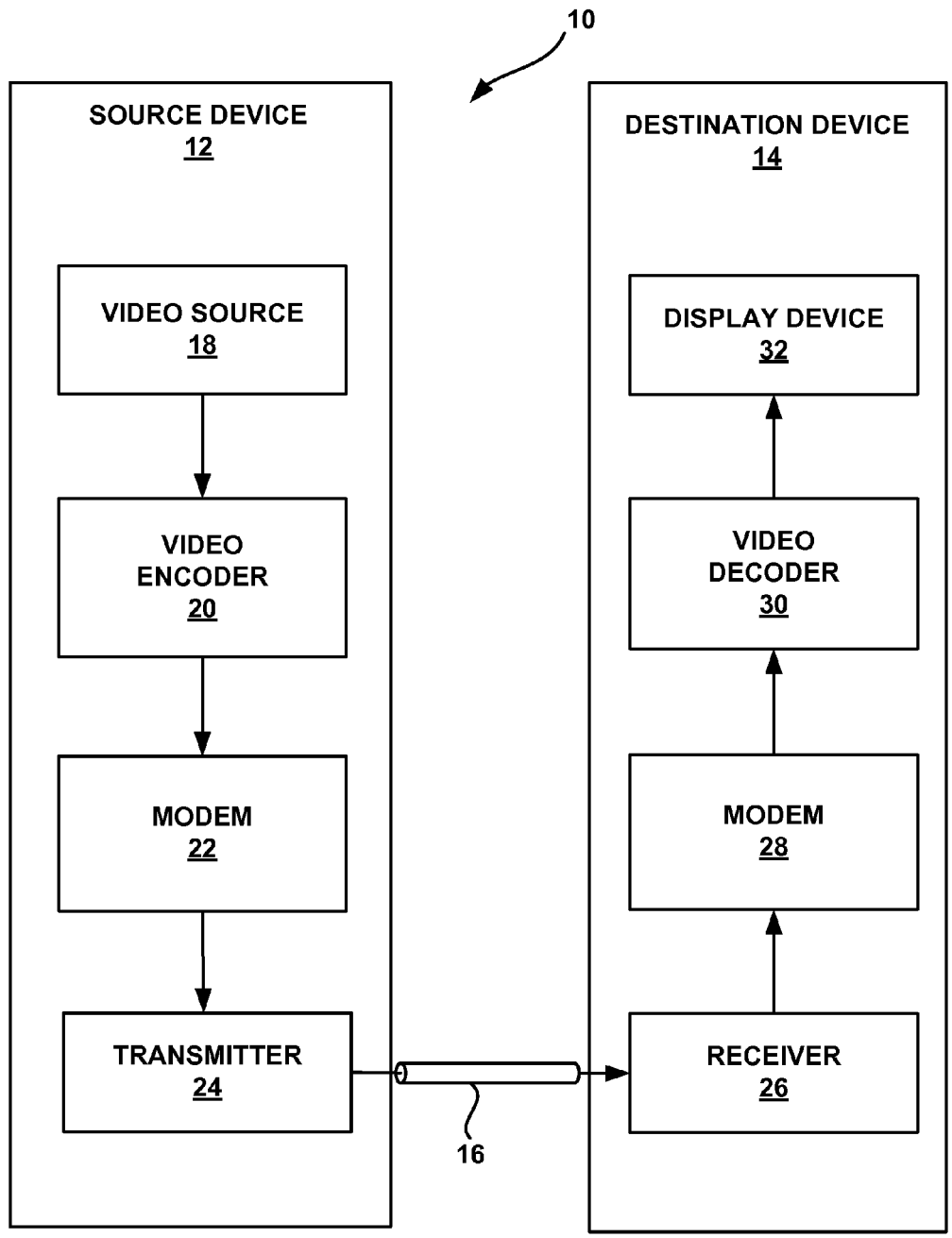
FIG. 1 is a block diagram illustrating an example video encoding and decoding system that may utilize the techniques of this disclosure for supporting intra smoothing.

In general, this disclosure describes techniques for determining and applying a smoothing filter to pixels surrounding the prediction samples used in intra-prediction coding of video data. The techniques may include determining whether to apply a smoothing filter to a current block of video data that is being encoded. For example, a determination of whether to apply the smoothing filter may be based on the size of the current block being encoded and the encoding mode associated with the current block. The encoding mode of the current block may be based on the direction associated with the intra-prediction coding of the current block or the direction of the current block relative to the block from which the current block is predicted. Filtering decision tables may be generated and used to make decisions regarding whether to apply intra smoothing filtering to a current block and/or the type of intra smoothing filter to apply to a current block. Therefore, the filtering decision may be a function of block size and intra prediction mode associated with a current block.

In video coding, prediction may be utilized to increase efficiency and reduce the amount of encoded video data, and therefore, the amount of video data transmitted or stored for subsequent retrieval and display. Two types of prediction are frequently used in modern video coding systems, inter-prediction and intra-prediction. In inter-prediction, a current video block is predicted from a video block in another frame in the video sequence. In intra-prediction, the current video block is predicted from a video block within the same frame.

As noted above, intra-prediction coding involves encoding the pixels of a current block of a frame relative to pixels of previously-encoded blocks of the same frame by performing directional extrapolation of pixels surrounding the current block. In this manner, the surrounding pixels are used as prediction samples to form pixels for the current block. In general, the pixels are used to form the current block along a specified direction. As the current block size increases, the prediction accuracy of the pixels of the current block that are farther away from the prediction samples may be degraded.

To overcome the degradation in intra-prediction coding, smoothing is applied to the surrounding prediction samples.

The video coding process may apply a smoothing filter to prediction pixels, perform and compare prediction using both filtered and unfiltered pixels, and determine and signal whether to use the filtered or unfiltered pixels based on the outcome of the comparison. Using this method, which may be referred to as adaptive intra smoothing (AIS), results in increasing encoder complexity, as it requires applying the smoothing filter to each block and comparing the result to the unfiltered block. Also, using this method, which explicitly signals whether or not a particular smoothing filter should be applied, adds to the overhead information associated with each coding unit. Additionally, entropy coding and decoding the MS data (e.g., the signal, the smoothing filter, and the like) adds complexity to the encoding and decoding process.

Another way to perform AIS is to make use of a filter indicator table at the encoder and decoder, where the indicator value depends on the block size and the intra-prediction mode, which indicates the direction of prediction. The table may be generated during a design stage, thus avoiding the increase in encoder computational complexity because the decision as to whether or not pixels are filtered is not performed during the encoding process. However, certain changes to the video encoder/decoder may require generating a new table to replace a current table.

Techniques of this disclosure propose a simplified AIS scheme or mode-dependent intra smoothing (MDIS) that is rule-based, where the rules as to whether or not to apply a smoothing filter are based on the size of the current block and the prediction mode or direction. MDIS may order the prediction modes in a hierarchy, which may be mapped to the different block sizes, where for increasing block sizes, more modes are filtered according to the hierarchy. In some examples, the determination of whether or not to apply a smoothing filter may be further distinguished between larger blocks and smaller blocks, where the methodology of determining whether or not to apply a smoothing filter may vary based on the block size. Additionally, for some video sequences, e.g., those with directional texture, applying a smoothing filter may provide little to no benefit. Techniques of this disclosure may also make the smoothing filter determinations to address these issues. Intra-prediction and smoothing filter information may be encoded in headers of corresponding blocks and decoded by a video decoder to apply the appropriate smoothing filter during decoding.

FIG. 1 is a block diagram illustrating an example video encoding and decoding system 10 that may utilize the techniques of this disclosure for applying a smoothing filter during intra-prediction coding. As shown in FIG. 1, system 10 includes a source device 12 that transmits encoded video to a destination device 14 via a communication channel 16. Source device 12 and destination device 14 may comprise any of a wide range of devices. In some examples, source device 12 and destination device 14 may comprise wireless communication devices, such as wireless handsets, so-called cellular or satellite radiotelephones, or any wireless devices that can communicate video information over a communication channel 16, in which case communication channel 16 is wireless.

The techniques of this disclosure, however, which generally concern techniques for intra-prediction coding, are not necessarily limited to wireless applications or settings. For example, these techniques may also be useful in a wide range of other settings and devices, including devices that communicate via physical wires, optical fibers or other physical or wireless media, may apply to over-the-air television broadcasts, cable television transmissions, satellite television transmissions, Internet video transmissions, encoded digital video that is encoded onto a storage medium, or other scenarios. For example, encoded video may be stored on a storage device for subsequent retrieval, decoding, and display by destination device 14. In addition, the encoding or decoding techniques may also be applied in a standalone device that does not necessarily communicate with any other device. Accordingly, communication channel 16 may comprise any combination of wireless or wired media suitable for transmission of encoded video data or other storage media, and devices 12, 14 may comprise any of a variety of wired or wireless media devices such as mobile telephones, smartphones, digital media players, set-top boxes, televisions, displays, desktop computers, portable computers, tablet computers, gaming consoles, portable gaming devices, or the like.

In the example of FIG. 1, source device 12 includes a video source 18, video encoder 20, a modulator/demodulator (modem) 22 and a transmitter 24. Destination device 14 includes a receiver 26, a modem 28, a video decoder 30, and a display device 32. In other examples, a source device and a destination device may include other components or arrangements. For example, source device 12 may receive video data from an external video source 18, such as an external camera, a video storage archive, a computer graphics source, or the like. Likewise, destination device 14 may interface with an external display device, rather than including an integrated display device.

The illustrated system 10 of FIG. 1 is merely one example. Techniques for applying a smoothing filter in intra-prediction coding may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source device 12 and destination device 14 are merely examples of such coding devices in which source device 12 generates coded video data for transmission to destination device 14. In some examples, devices 12, 14 may operate in a substantially symmetrical manner such that each of devices 12, 14 includes video encoding and decoding components. Hence, system 10 may support one- or two-way video transmission between video devices 12, 14, e.g., for video streaming, video playback, video broadcasting, or video telephony.

Video source 18 of source device 12 may include a video capture device, such as a video camera, a video archive containing previously captured video, and/or a video feed from a video content provider. As a further alternative, video source 18 may generate computer graphics-based data as the source video, or a combination of live video, archived video, and computer-generated video. In some cases, if video source 18 is a video camera, source device 12 and destination device 14 may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by video encoder 20. The encoded video information may then be modulated by modem 22 according to a communication standard, and transmitted to destination device 14 via transmitter 24. Modem 22 may include various mixers, filters, amplifiers or other components designed for signal modulation. Transmitter 24 may include circuits designed for transmitting data, including amplifiers, filters, and one or more antennas.

Receiver 26 of destination device 14 receives information over channel 16, and modem 28 demodulates the information. Again, the video encoding process may implement one or more of the techniques described herein for applying a smoothing filter during intra-prediction coding of a current block. The information communicated over channel 16 may include syntax information defined by video encoder 20, which is also used by video decoder 30, that includes syntax elements that describe characteristics and/or processing of prediction units (PUs), coding units (CUs) or other units of coded video, e.g., video slices, video frames, and video sequences or groups of pictures (GOPs). Display device 32 displays the decoded video data to a user, and may comprise any of a variety of display devices such as a cathode ray tube (CRT), a liquid crystal display (LCD), a plasma display, an organic light emitting diode (OLED) display, or another type of display device.

In the example of FIG. 1, communication channel 16 may comprise any wireless or wired communication medium, such as a radio frequency (RF) spectrum or one or more physical transmission lines, or any combination of wireless and wired media. Communication channel 16 may form part of a packet-based network, such as a local area network, a wide-area network, or a global network such as the Internet. Communication channel 16 generally represents any suitable communication medium, or collection of different communication media, for transmitting video data from source device 12 to destination device 14, including any suitable combination of wired or wireless media. Communication channel 16 may include routers, switches, base stations, or any other equipment that may be useful to facilitate communication from source device 12 to destination device 14.

Video encoder 20 and video decoder 30 may operate according to a video compression standard, such as the emerging High Efficiency Video Coding (HEVC) standard or the ITU-T H.264 standard, alternatively referred to as MPEG-4, Part 10, Advanced Video Coding (AVC). The techniques of this disclosure, however, are not limited to any particular coding standard. Other examples include MPEG-2 and ITU-T H.263. Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

The ITU-T H.264/MPEG-4 (AVC) standard was formulated by the ITU-T Video Coding Experts Group (VCEG) together with the ISO/IEC Moving Picture Experts Group (MPEG) as the product of a collective partnership known as the Joint Video Team (JVT). In some aspects, the techniques described in this disclosure may be applied to devices that generally conform to the H.264 standard. The H.264 standard is described in ITU-T Recommendation H.264, Advanced Video Coding for generic audiovisual services, by the ITU-T Study Group, and dated March, 2005, which may be referred to herein as the H.264 standard or H.264 specification, or the H.264/AVC standard or specification.

The Joint Video Team (JVT) continues to work on extensions to H.264/AVC, and to develop new standards, e.g., for HEVC. The HEVC standardization efforts are based on a model of a video coding device referred to as the HEVC Test Model (HM). The HM presumes several additional capabilities of video coding devices relative to existing devices according to, e.g., ITU-T H.264/AVC. For example, whereas H.264 provides nine intra-prediction encoding modes, the HM provides as many as thirty-five intra-prediction encoding modes.

The HM refers to a block of video data as a coding unit (CU). Syntax data within a bitstream may define a largest coding unit (LCU), which is a largest coding unit in terms of the number of pixels. In general, a CU has a similar purpose to a macroblock of the H.264 standard, except that a CU does not have a size distinction. Thus, a CU may be split into sub-CUs. In general, references in this disclosure to a CU may refer to a largest coding unit of a picture or a sub-CU of an LCU. An LCU may be split into sub-CUs, and each sub-CU may be further split into sub-CUs. Syntax data for a bitstream may define a maximum number of times an LCU may be split, referred to as CU depth. Accordingly, a bitstream may also define a smallest coding unit (SCU). This disclosure also uses the term "block" to refer to any of a CU, PU, or TU. Moreover, where this disclosure refers to examples involving a coding unit or CU, it should be understood that other examples may be provided with respect to macroblocks substituted for coding units.

An LCU may be associated with a quadtree data structure. In general, a quadtree data structure includes one node per CU, where a root node corresponds to the LCU. If a CU is split into four sub-CUs, the node corresponding to the CU includes four leaf nodes, each of which corresponds to one of the sub-CUs. Each node of the quadtree data structure may provide syntax data for the corresponding CU. For example, a node in the quadtree may include a split flag, indicating whether the CU corresponding to the node is split into sub-CUs. Syntax elements for a CU may be defined recursively, and may depend on whether the CU is split into sub-CUs.

A CU that is not split (e.g., corresponding to a leaf node in the quadtree data structure) may include one or more prediction units (PUs). In general, a PU represents all or a portion of the corresponding CU, and includes data for retrieving a reference sample for the PU. For example, when the PU is intra-mode encoded, the PU may include data describing an intra-prediction mode for the PU. The data describing the intra-prediction mode may define, for example, the direction associated with the intra-prediction mode for the PU (luma and chroma components), and block size associated with the PU. As another example, when the PU is inter-mode encoded, the PU may include data defining a motion vector for the PU. The data defining the motion vector may describe, for example, a horizontal component of the motion vector, a vertical component of the motion vector, a resolution for the motion vector (e.g., one-quarter pixel precision or one-eighth pixel precision), a reference frame to which the motion vector points, and/or a reference frame list (e.g., list 0 or list 1) for the motion vector, and the motion vector predictor index. Data for the CU defining the PU(s) may also describe, for example, partitioning of the CU into one or more PUs. Partitioning modes may differ between whether the CU is uncoded, intra-prediction mode encoded, or inter-prediction mode encoded.

A CU having one or more PUs may also include one or more transform units (TUs). Following prediction using a PU, a video encoder may calculate a residual value for the portion of the CU corresponding to the PU. The residual value corresponds to pixel difference values that may be transformed into transform coefficients, quantized, and scanned to produce serialized transform coefficients for entropy coding. A size of the TU is not necessarily limited to the size of a PU. In particular, TUs may be the same size, or smaller than corresponding PUs for a CU. In some examples, the maximum size of a TU may be the size of the corresponding CU. In general, TUs may comprise the data structures that include the residual transform coefficients associated with a given CU.

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. Each of video encoder 20 and video decoder 30 may be included in one or more encoders or decoders, either of which may be integrated as part of a combined encoder/decoder (CODEC) in a respective camera, computer, mobile device, subscriber device, broadcast device, set-top box, server, or the like.

A video sequence typically includes a series of video frames. A group of pictures (GOP) generally comprises a series of one or more video frames. A GOP may include syntax data in a header of the GOP, a header of one or more frames of the GOP, or elsewhere, that describes a number of frames included in the GOP. Each frame may include frame syntax data that describes an encoding mode for the respective frame. Video encoder 20 typically operates on video blocks within individual video frames in order to encode the video data. A video block may correspond to a coding unit (CU) or a partition unit (PU) of the CU. The video blocks may have fixed or varying sizes, and may differ in size according to a specified coding standard. Each video frame may include a plurality of slices. Each slice may include a plurality of CUs, which may include one or more PUs.

As an example, the HEVC Test Model (HM) supports prediction in various CU sizes. The size of an LCU may be defined by syntax information. Assuming that the size of a particular CU is 2N×2N, the HM supports intra-prediction in sizes of 2N×2N or N×N, and inter-prediction in symmetric sizes of 2N×2N, 2N×N, N×2N, or N×N. The HM also supports asymmetric splitting for inter-prediction of 2N×nU, 2N×nD, nL×2N, and nR×2N. In asymmetric splitting, one direction of a CU is not split, while the other direction is split into 25% and 75%. The portion of the CU corresponding to the 25% split is indicated by an "n" followed by an indication of "Up", "Down," "Left," or "Right." Thus, for example, "2N×nU" refers to a 2N×2N CU that is split horizontally with a 2N×0.5N PU on top and a 2N×1.5N PU on bottom.

In this disclosure, "N×N" and "N by N" may be used interchangeably to refer to the pixel dimensions of a video block (e.g., CU, PU, or TU) in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a nonnegative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

As noted above, CUs may be encoded using inter-predictive coding or intra-predictive coding. In intra-prediction, a current block may be predicted relative to a block in the same frame that has already been encoded. Typically, blocks of a frame are coded left-to-right and top-to-bottom, or in some examples in a z-scan order. Therefore, a current block may be predicted relative to blocks anywhere above it or to the left of the current block. The block sizes in intra-prediction coding can vary from a relatively small size, e.g., 2×2, to a relatively large size, e.g., 128×128. The direction of prediction or the direction from an already encoded block to the current block may determine the intra-prediction mode. The HM allows up to 34 modes, which include 33 different intra-prediction directional modes, corresponding to an extrapolation direction and one DC mode. Each of the 33 of the intra-prediction directional modes corresponds to an angle between 0 and 180 (or between 45 and −135 degrees from the horizontal, going clockwise, in the example of FIG. 2A), with an angle resolution close to 5.625° indicative of the direction of extrapolation of pixels from the block used to predict the pixels of the current block. The non-directional mode (designated with mode 2) corresponds to DC, where a sampling of the neighboring pixels is used to predict the pixels of the current block. In some examples, the HM may allow a 35th mode (mode 34) corresponding to a planar mode, where the values of the pixels may be adjusted using a gradient function, discussed in more detail below.

During intra-predictive coding, the quality of prediction accuracy may be affected and degraded. For example, as the size of the PU increases, the prediction accuracy of the pixels farther away from the predictor pixels may be degraded. Degradation of prediction accuracy may result in more residual data, which may result in more data that needs to be encoded, transmitted, or stored. A smoothing filter may be applied to predictor pixels used to predict a block to improve the prediction accuracy. In some cases, however, better results are achieved without using a smoothing filter. As noted above, current standards utilize adaptive intra smoothing (AIS) techniques.

Techniques of this disclosure propose a simplified AIS scheme that is rule-based, where the rules as to whether or not to apply a smoothing filter are mainly based on the size of the current block and the prediction mode or direction. In HM, block sizes vary from a small size, e.g., 2×2, to as large as 128×128, for example. Intra-prediction modes available to each block may vary based on the size, as will be explained in more detail below. For each block size, a smoothing filter may be needed when prediction is applied in some directions, but not other directions, where the directions correspond to different intra-prediction modes. In one example, the combinations of sizes and intra-prediction modes for which a smoothing filter is applied may be pre-defined in a look-up table (LUT). Therefore, determining whether to apply a smoothing filter may be generic and remains the same regardless of changes to the encoder and/or decoder, and signaling of the filtering determination may not be needed. Additionally, making the determination of whether or not to apply a smoothing filter does not incur significant encoder complexity.

In some examples, the determination of whether or not to apply a smoothing filter may be further distinguished between larger blocks and smaller blocks, where the methodology of determining whether or not to apply a smoothing filter may vary based on the block size. For example, for some block sizes, the encoder may perform prediction using both filtered and unfiltered pixels, and compare the results to determine whether or not to use a smoothing filter. The encoder may then signal the filtering mode, i.e., whether or not a smoothing filter is used in encoding the block. In one example, the filtering mode may be signaled if it is different from the decision that would be obtained based on the LUT, i.e., the default filtering decision.

In one example, one or more smoothing filters (e.g., filter candidates) may be defined. For each block size and intra-prediction mode combination, a table may define the appropriate filter to use. For combinations for which no smoothing filter is used, the defined filter may be an all-pass filter. A primary table may include the most probable smoothing filter for each corresponding combination of block size and intra-prediction mode. In some examples, a secondary table (or several additional tables) may be defined to include the second most probable smoothing filter (or several possible smoothing filters in the case of several additional tables) for each corresponding combination of block size and intra-prediction mode. In one example, the most probable smoothing filter information may be utilized, unless otherwise indicated. Information associated with intra-predictive coding (e.g., block size and intra-prediction mode) and smoothing filter information (e.g., filtering mode and probable smoothing filter table(s)) may be encoded in headers (or other data structures, such as footers) of corresponding blocks and decoded by a video decoder to apply the appropriate smoothing filter during decoding.

Following intra-predictive or inter-predictive coding to produce predictive data (e.g., a PU for a CU), video encoder 20 may calculate residual data to produce one or more transform units (TUs) for the CU. PUs of a CU may comprise pixel data in the spatial domain (also referred to as the pixel domain), while TUs of the CU may comprise coefficients in the transform domain, e.g., following application of a transform such as a discrete cosine transform (DCT), an integer transform, a wavelet transform, or a conceptually similar transform to residual video data. The residual data may correspond to pixel differences between pixels of the unencoded picture and prediction values of a PU of a CU. Video encoder 20 may form one or more TUs including the residual data for the CU. Video encoder 20 may then transform the TUs.

Following any transforms to produce transform coefficients, quantization of transform coefficients may be performed. Quantization generally refers to a process in which transform coefficients are quantized to possibly reduce the amount of data used to represent the coefficients. The quantization process may reduce the bit depth associated with some or all of the coefficients. For example, an n-bit value may be rounded down to an m-bit value during quantization, where n is greater than m.

In some examples, video encoder 20 may utilize a pre-defined scan order to scan the quantized transform coefficients to produce a serialized vector that can be entropy encoded. In other examples, video encoder 20 may perform an adaptive scan. After scanning the quantized transform coefficients to form a one-dimensional vector, video encoder 20 may entropy encode the one-dimensional vector, e.g., according to content adaptive variable length coding (CAVLC), context adaptive binary arithmetic coding (CABAC), syntax-based context-adaptive binary arithmetic coding (SBAC), or another entropy coding methodology.

A processing unit configured for entropy coding, or another processing unit, may perform other processing functions, such as zero run length coding of quantized coefficients and/or generation of syntax information such as coded block pattern (CBP) values, macroblock type, coding mode, LCU size, or the like.

Video decoder 30 of destination device 14 may be configured to perform techniques similar, and generally symmetric, to any or all of the techniques of video encoder 20 of this disclosure. For example, video decoder 30 may receive entropy-encoded CUs of a video frame. This received data may include syntax elements indicating whether intra-predictive coding was utilized to encode the CU at video encoder 20. In accordance with techniques of this disclosure, the syntax elements associated with intra-predictive coding may include such information as, for example, the intra-prediction mode or direction of prediction, the block size, and other information associated with the smoothing filter, when applicable.

For example, video decoder 30 may determine that a CU is encoded using intra-predictive coding, and decode syntax elements included with the encoded CU to determine the intra-prediction mode of the CU. Video encoder 30 may also determine the size of the block used in the intra-predictive coding, and using the block size and intra-prediction mode information, video decoder 30 may determine whether or not to apply a smoothing filter to the predictor pixels when predicting a block.

In one example, video decoder 30 may determine whether or not to apply a smoothing filter based on the combination of block size and intra-prediction mode used to encode the block. If not indicated otherwise, video decoder 30 may utilize the most probable smoothing filter associated with the combination of block size and intra-prediction mode. If the smoothing filter used for the combination of block size and intra-prediction mode is different from the most probable smoothing filter for that combination, an indication may be decoded by video decoder 30 from the syntax elements associated with the block, and a smoothing filter from a second (or more) most probable smoothing filter for that combination is selected and utilized by video decoder 30.

In this manner, the amount of information encoded to indicate whether or not smoothing filter is applied in intra-predictive coding is minimized, and in some cases eliminated. For example, when the smoothing filter application decision is the most probable one for a combination of block size and intra-prediction mode, no signaling regarding the smoothing filter is encoded, and video decoder 30 is able to make the determination without requiring additional information other than the block size and the intra-prediction mode.

Video encoder 20 and video decoder 30 each may be implemented as any of a variety of suitable encoder or decoder circuitry, as applicable, such as one or more microprocessors, digital signal processors (DSPs), application specific integrated circuits (ASICs), field programmable gate arrays (FPGAs), discrete logic circuitry, software, hardware, firmware or any combinations thereof. Each of video encoder 20 and video decoder 30 may be included in one or more encoders or decoders, either of which may be integrated as part of a combined video encoder/decoder (CODEC). An apparatus including video encoder 20 and/or video decoder 30 may comprise an integrated circuit, a microprocessor, and/or a wireless communication device, such as a cellular telephone.

Figure 2A:
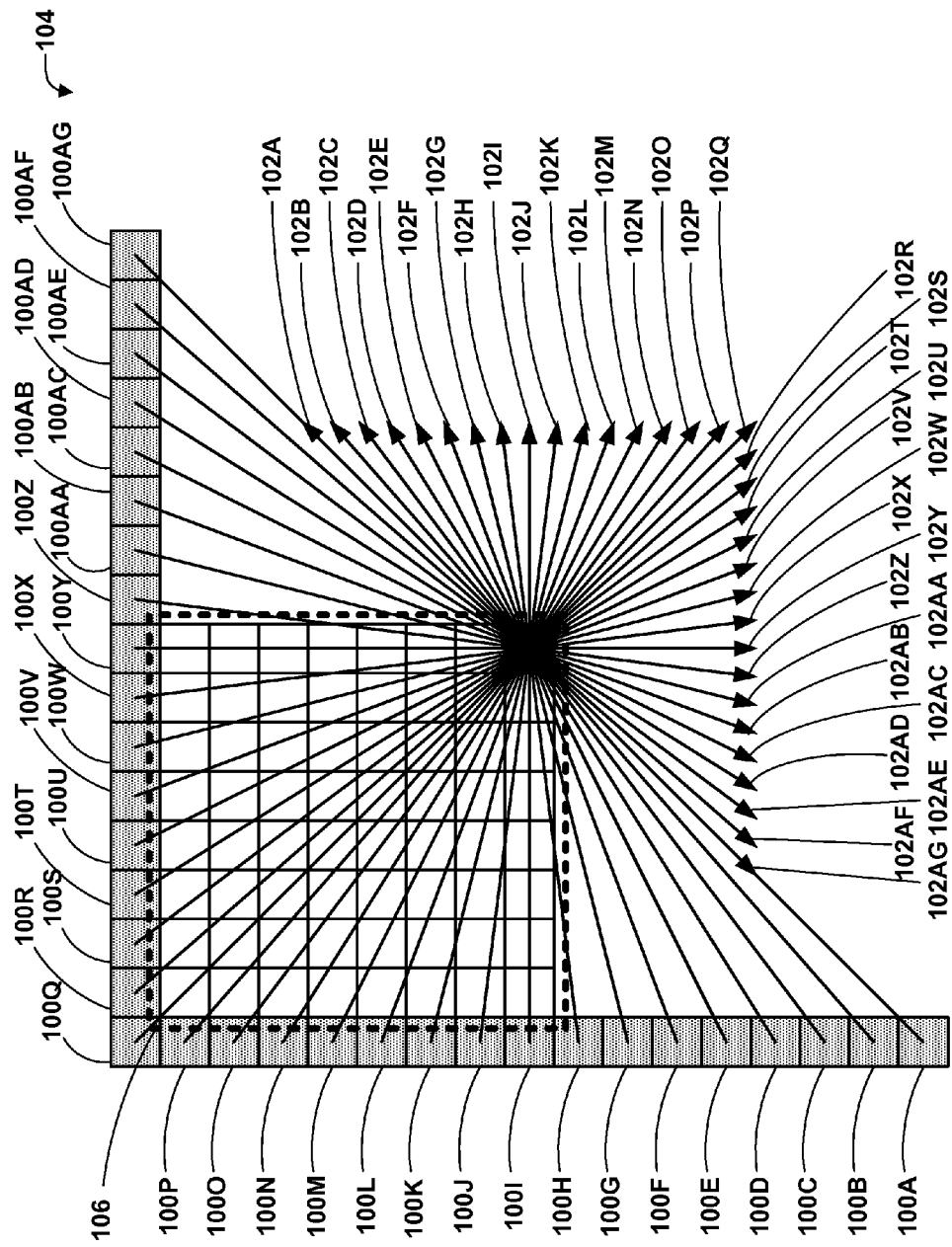
FIG. 2A is a conceptual diagram illustrating a graph that depicts an example set of prediction directions associated with various intra-prediction modes.
Figure 3:
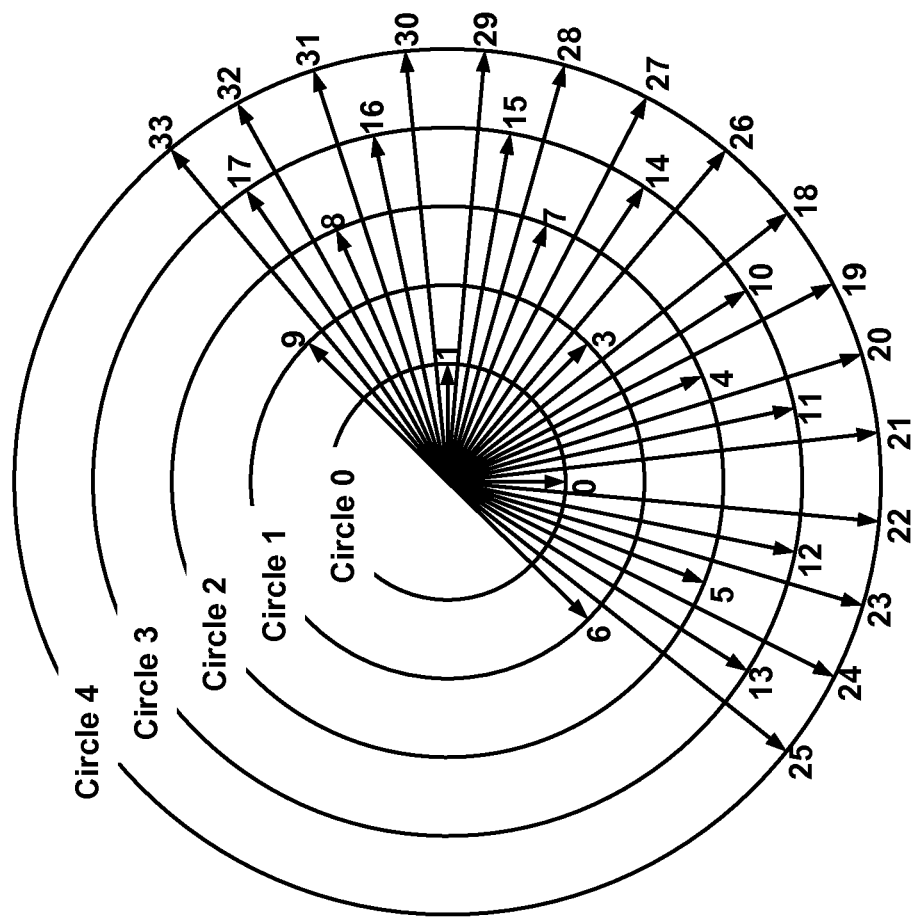
FIG. 3 is a conceptual diagram illustrating an example set of prediction directions associated with various intra-prediction modes.

FIG. 2A is a conceptual diagram illustrating a graph that depicts an example set of prediction directions associated with various intra-prediction modes. As noted above, the HM provides as many as thirty-three intra-prediction directional encoding modes. An HM encoder (e.g., video encoder 20) may be configured such that the available set of intra-prediction modes for a block may depend on the size of the block or PU. That is, the size of a block may determine the number of intra-prediction modes available for the block, from which the encoder may select an intra-prediction mode to predict the block. TABLE 1 below illustrates one example of correspondence between block sizes and the intra-prediction modes available for blocks of that size. The directions associated with the intra-prediction modes are illustrated in FIG. 3. Mode 2, not shown on FIG. 3, corresponds to DC mode, where a sampling of the neighboring pixels is used to predict the pixels of the current block.

TABLE 1

| PU or block Size | Intra prediction modes |
|---|---|
| 2 × 2 | 0~3 |
| 4 × 4 | 0~16 |
| 8 × 8 | 0~33 |
| 16 × 16 | 0~33 |
| 32 × 32 | 0~33 |
| 64 × 64 | 0~5 |
| 128 × 128 | 0~5 |

In the example of FIG. 2A, block 106 (indicated with the dotted outline) can be predicted from neighboring pixels 100A-100AG (neighboring pixels 100) depending on a selected intra-prediction mode. Arrows 102A-102AG (arrows 102) represent directions or angles associated with various intra-prediction modes. The example of FIG. 2A is representative of intra-prediction modes provided by the HM. However, in other examples, more or fewer intra-prediction modes may be provided. Although the example of block 106 is an 8×8 pixel block, in general, a block may have any number of pixels, e.g., 4×4, 8×8, 16×16, 32×32, 64×64, 128× 128, etc. Although the example of block 106 is square, the techniques of this disclosure may also be applied to other block sizes, e.g., N×M blocks, where N is not necessarily equal to M.

An intra-prediction mode may be defined according to an angle of the prediction direction relative to, for example, a horizontal axis that is perpendicular to the vertical sides of block 106. Thus, each of arrows 102 may represent a particular angle of a prediction direction of a corresponding intra-prediction mode. In some examples, an intra-prediction direction mode may be defined by an integer pair (dx, dy), which may represent the direction the corresponding intra-prediction mode uses for context pixel extrapolation. That is, the angle of the intra-prediction mode may be calculated as dy/dx. In other words, the angle may be represented according to the horizontal offset dx and the vertical offset dy. The value of a pixel at location (x, y) in block 106 may be determined from the one or more of neighboring pixels 100 through which a line passes that also passes through location (x, y) with an angle of dy/dx.

Figure 2B:
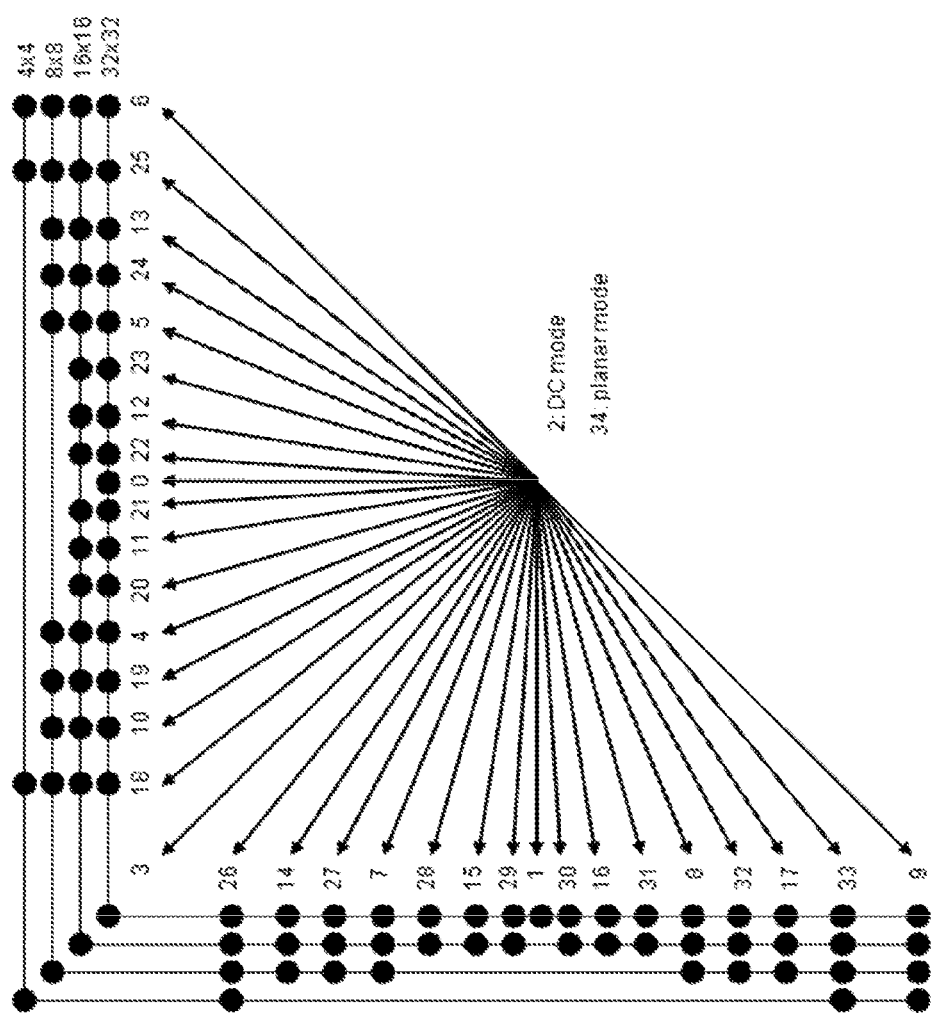
FIG. 2B is a conceptual diagram illustrating another graph that depicts an example set of prediction directions associated with various intra-prediction modes.

FIG. 2B is a conceptual diagram illustrating a graph that depicts another example set of prediction directions associated with various intra-prediction modes. In the example of FIG. 2B, thirty-three intra-prediction directional encoding modes are shown, similar to those shown in FIG. 2A. In this example, in addition to the 33 directional modes, there are two additional modes, mode 2 corresponding to DC mode and mode 34 corresponding to planar mode.

In the example of FIG. 2B, the encoder and/or decoder may be configured such that the available set of intra-prediction modes for a block may depend on the size of the block, e.g., PU, CU, or TU. That is, the size of a block may determine the number of intra-prediction modes available for the block, from which the encoder may select an intra-prediction mode to predict the block. TABLE 2 below illustrates another example of correspondence between block sizes and the intra-prediction modes available for blocks of that size.

TABLE 2

| PU or block Size | Intra prediction modes |
|---|---|
| 4 × 4 | 0~16, 34 |
| 8 × 8 | 0~34 |

TABLE 2-continued

| PU or block Size | Intra prediction modes |
|---|---|
| 16 × 16 | 0~34 |
| 32 × 32 | 0~34 |
| 64 × 64 | 0~2, 34 |

FIG. 3 is a conceptual diagram illustrating an example set of prediction directions associated with various intra-prediction modes. Each of the 33 intra-prediction directional modes provided by the HM corresponds to a direction with a specified angle. For example, mode 1 corresponds to a horizontal extrapolation direction or at an angle of 0° from the horizontal, where a block encoded using mode 1 is predicted from pixels directed to its left. As another example, mode 0 corresponds to a vertical extrapolation direction or at an angle of 90° from the horizontal, where a block encoded using mode 0 is predicted from pixels directly above it. As another example, modes 3, 6, and 9 correspond to a diagonal extrapolation direction at an angle resolution of 45°. Modes 0, 1, and 3-33 correspond to prediction directions that span 180° (between modes 6 and 9), with an angle resolution close to 5.625°. Mode 2, in the example of the HM, corresponds to the DC mode, where a sampling of the eight neighboring pixels is used to predict the pixels of the current block. Mode 34 corresponds to the planar mode, where a linear plane function that is fitted to the block of prediction purposes may be included. The planar mode may work well in areas of smoothly-varying luminance. Planar mode may be effective for predicting larger blocks, but may be less efficient when used for predicting smaller blocks. The circles of FIG. 3 represent the angle resolution of the intra-prediction directional modes associated with each circle. For example, for circle 0, the resolution between the modes inside the circle (modes 0 and 1) is 90 degree, the resolution between the modes inside circle 1 (modes 3, 6, and 9) is 45 degree, the resolution between the mode insider circle 2 (modes 4, 5, 7, and 8) is 22.5 degrees, and so forth.

Figure 4:
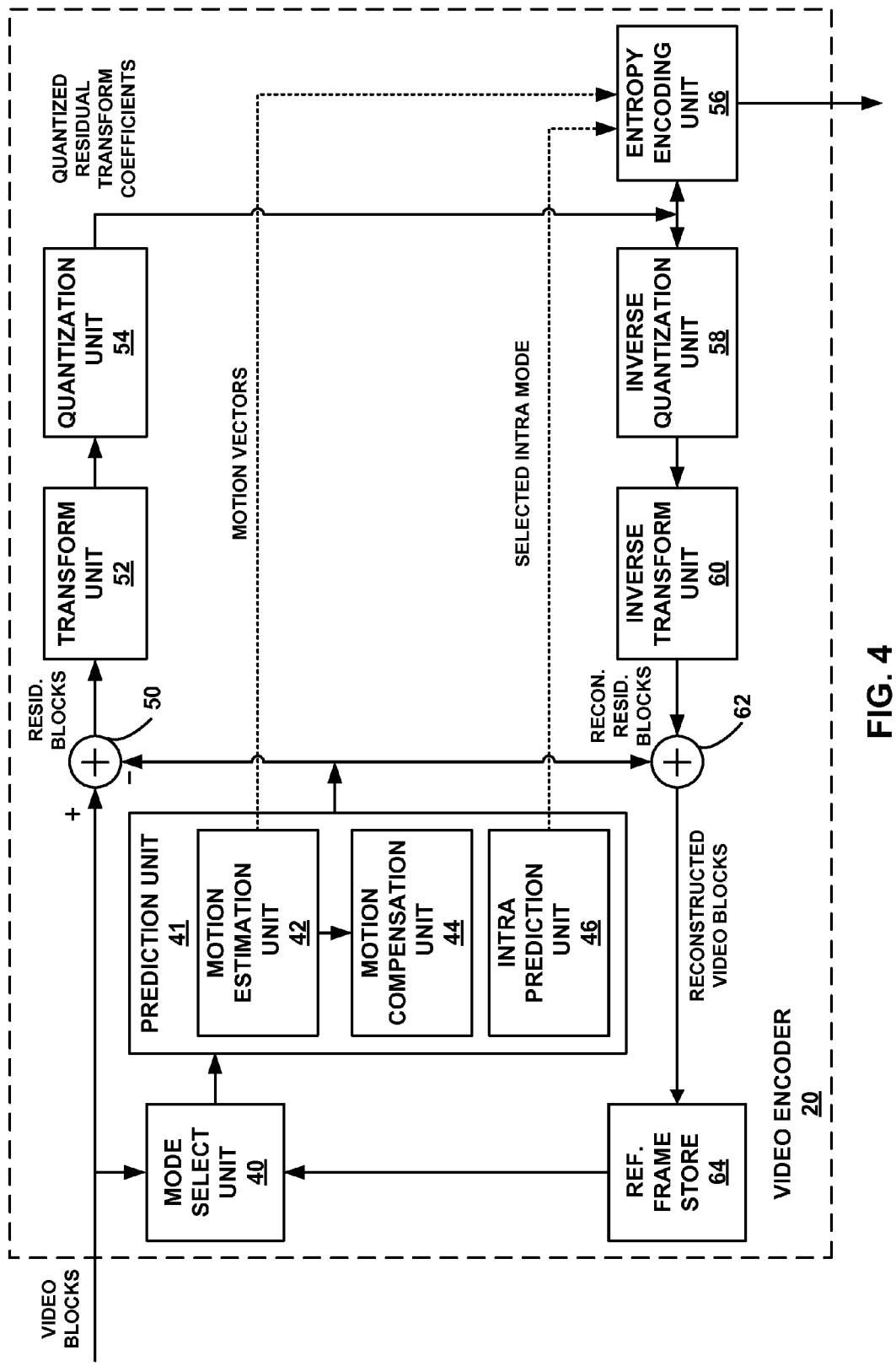
FIG. 4 is a block diagram illustrating an example of a video encoder that may implement techniques for supporting intra smoothing.

FIG. 4 is a block diagram illustrating an example of video encoder 20 that may implement techniques for applying a smoothing filter to pixels surrounding the prediction samples used in intra-prediction coding of video data. Video encoder 20 may perform intra- and inter-prediction of video blocks within video frames, including LCUs, CUs, and PUs, and calculate residual values that may be encoded as TUs. Intra-coding relies on spatial prediction to reduce or remove spatial redundancy in video within a given video frame. Inter-coding relies on temporal prediction to reduce or remove temporal redundancy in video within adjacent frames of a video sequence. Intra-mode (I-mode) may refer to any of several spatial based compression modes. Inter-modes such as uni-directional prediction (P-mode), bi-directional prediction (B-mode), or generalized PB prediction (GPB-mode) may refer to any of several temporal-based compression modes. Motion estimation unit 42 and motion compensation unit 44 may perform inter-prediction coding, while intra-prediction unit 46 may perform intra-prediction coding.

As shown in FIG. 4, video encoder 20 receives a current video block within a video frame or slice to be encoded. In the example of FIG. 4, video encoder 20 includes mode select unit 40, prediction unit 41, reference frame store 64, summer 50, transform unit 52, quantization unit 54, and entropy coding unit 56. Prediction unit 41 includes motion estimation unit 42, motion compensation unit 44, and intra prediction unit 46. For video block reconstruction, video encoder 20 also includes inverse quantization unit 58, inverse transform unit 60, and summer 62. A deblocking filter (not shown in FIG. 4) may also be included to filter block boundaries to remove blockiness artifacts from reconstructed video. If desired, the deblocking filter would typically filter the output of summer 62.

During the encoding process, video encoder 20 receives a video frame or slice to be coded. The frame or slice may be divided into multiple video blocks or CUs. Motion estimation unit 42 and motion compensation unit 44 perform inter-predictive coding of the received video block relative to one or more blocks in one or more reference frames to provide temporal compression. Intra-prediction unit 46 may perform intra-predictive coding of the received video block relative to one or more neighboring blocks in the same frame or slice as the block to be coded to provide spatial compression.

Mode select unit 40 may select one of the coding modes, intra or inter, e.g., based on error results, and provides the selection of the coding mode to prediction unit 41. Prediction unit 41 then produces an intra- or inter-coded block and provides the coded block to summer 50 to generate residual block data and to summer 62 to reconstruct the encoded block for use as a reference frame. When mode select unit 40 selects intra-predictive encoding for a block, intra prediction unit 46 may select an intra-prediction mode for the block. For example, the selected intra-prediction mode may be one of the 35 modes provided by the HM. The number of intra-prediction modes from which an intra-prediction mode is selected for a give block may depend on the size of the block as shown in the example of TABLE 1 above.

In one example, when mode select unit 40 select inter-predictive coding, motion estimation unit 42 and motion compensation unit 44 may perform processing associated with inter-predictive coding to generate an inter-coded block. Motion estimation unit 42 and motion compensation unit 44 may be highly integrated, but are illustrated separately for conceptual purposes. Motion estimation, performed by motion estimation unit 42, is the process of generating motion vectors, which estimates motion for video blocks. A motion vector, for example, may indicate the displacement of a predictive block or PU within a predictive reference frame (or other coded unit) relative to the current block being coded within the current frame (or other coded unit). A predictive block is a block that is found to closely match the video block or PU to be coded in terms of pixel difference, which may be determined by sum of absolute difference (SAD), sum of square difference (SSD), or other difference metrics.

A motion vector may also indicate displacement of a partition of a macroblock. Motion compensation may involve fetching or generating the predictive block based on the motion vector determined by motion estimation. In some examples, video encoder 20 may calculate values for sub-integer pixel positions of reference frames stored in reference frame store 64. For example, video encoder 20 may calculate values of one-quarter pixel positions, one-eighth pixel positions, or other fractional pixel positions of the reference frame. Therefore, motion estimation unit 42 may perform a motion search relative to the full pixel positions and fractional pixel positions and output a motion vector with fractional pixel precision.

Motion estimation unit 42 calculates a motion vector for a video block or PU of an inter-coded frame by comparing the PU to blocks of a reference frame in reference frame store 64. Motion compensation unit 44 may also interpolate sub-integer pixels of the reference frame, e.g., an I-frame or a P-frame. The HM, as an example, describes two lists: list 0, which includes reference frames having a display order earlier than a current frame being encoded, and list 1, which includes reference frames having a display order later than the current frame being encoded. Therefore, data stored in reference frame store 64 may be organized according to these lists. In some cases, motion estimation unit 42 may further calculate a motion vector difference (MVD) value for the motion vector and pass the MVD value, rather than the motion vector itself, to entropy coding unit 56.

In one example, when mode select unit 40 select intra-predictive coding, intra-prediction unit 46 may perform processing associated with intra-predictive coding to generate an intra-coded block. As noted above, based on the size of the block, the number of intra-prediction modes available for the block may be determined. An example of a correspondence between block size and number of intra-prediction modes available for blocks of that size is shown in TABLE 1 and TABLE 2 above. Intra predictive unit 46 may intra-predictive encode the current video block relative to neighboring, previously-coded blocks, e.g., blocks above, above and to the right, above and to the left, or to the left of the current block, assuming a left-to-right, top-to-bottom encoding order or blocks. Intra prediction unit 46 may utilize a neighboring block based on a selected intra-prediction mode for the current block.

Intra prediction unit 46 may determine the appropriate intra-prediction mode for the block, by selecting one of the available intra-prediction modes. Intra prediction unit 46 may select an intra-prediction mode by, for example, calculating error values for the various intra-prediction modes associated with the block size and selecting a mode that yields the lowest error value. Directional prediction modes may include functions for combining values of spatially neighboring pixels and applying the combined values to one or more pixel positions in a prediction unit (PU). Once values for all pixel positions in the PU have been calculated, intra-prediction unit 46 may calculate an error value for the prediction mode based on pixel differences between the PU and the current block to be encoded. Intra-prediction unit 46 may continue testing intra-prediction modes associated with the block size of the current block until an intra-prediction mode that yields an acceptable error value is discovered. The intra-prediction mode resulting in the lowest error value may then be used to generate the PU for the current block. Intra prediction unit 46 may signal the selected intra-prediction mode so that it is encoded with the syntax elements associated with the coded block.

In accordance with this disclosure, video encoder 20 may determine whether or not to apply a smoothing filter to the pixels around the prediction samples of a current block that is encoded using intra-predictive coding. The determination may be based on the block size and the intra-prediction mode used in coding the current block. In one example according to the techniques of this disclosure, the smoothing filter is not applied when modes 0, 1, or 2 are used, which correspond to the vertical, horizontal, and DC modes, respectively, because each of these modes provides relatively accurate prediction results without applying smoothing. Therefore, when the prediction direction is perfectly horizontal, vertical, or the intra-prediction mode is DC mode, the smoothing filter is not applied. Determining whether or not to apply a smoothing filter for other modes (i.e., the diagonal modes), depends on the prediction unit size and the intra-prediction mode. TABLE 3 below shows an example relationship of combinations of block size and intra-prediction mode for which a smoothing filter is applied. The combinations of block size and intra-prediction mode for which filtering may be applied may be based on off-line training and statistical results.

TABLE 3 does not represent the only type of relationships that could be defined, but merely provides on example consistent with this disclosure.

TABLE 3

| Block Size | Modes that are filtered | Shown in FIG. 3 |
| --- | --- | --- |
| 2 × 2 | no filtering for all modes | n/a |
| 4 × 4 | mode 3, 6, and 9 | modes between circle 0 and circle 1 |
| 8 × 8 | mode 3, 4, 5, 6, 7, 8, and 9 | modes between circle 0 and circle 2 |
| 16 × 16 | mode 3 to 17 | modes between circle 0 and circle 3 |
| 32 × 32 | mode 3 to 33 | modes between circle 0 and circle 4 |
| 64 × 64 | mode 3 to 4 | modes between circle 0 and circle 4 |
| 128 × 128 | mode 3 to 4 | modes between circle 0 and circle 4 |

As TABLE 3 illustrates, determining whether to apply a smoothing filter is generic and remains the same based on block size and intra-prediction mode used to encode the block. In one example, the combinations of sizes and intra-prediction modes shown above in TABLE 3, and for which a smoothing filter is applied, may be pre-defined in a look-up table (LUT). The LUT may be either available at both the encoder or decoder, or the encoder may send it to the decoder. Therefore, determining whether to apply a smoothing filter may be generic and remains the same regardless of changes to the encoder and/or decoder, and signaling of the filtering determination may not be needed. Additionally, making the determination of whether or not to apply a smoothing filter does not incur significant encoder complexity.

In one example, during intra-predictive encoding of a block, the encoder may determine whether or not to apply a smoothing filter to the predictive samples based on the combination of the size of the block and the intra-predictive mode used, and according to the combinations defined in an LUT. These combinations may be associated with a most probable filtering option as indicated in a most probable filter table. For example, a most probable filter table may be created to indicate for each combination of block size and intra-prediction mode, what filtering option to utilize. In one example, a smoothing filter may be selected from a candidate list of filters for the each combination of block size and intra-prediction mode. The no filtering option may be generalized into a smoothing filter that is an all-pass filter. In some examples, one or more smoothing filters may be used, where for example one smoothing filter may work better for some combinations of block sizes and intra-prediction modes and a second smoothing filter may work better for other combinations of block sizes and intra-prediction modes. The number of filters in the candidate set of smoothing filters may vary from one system to another. In one example, the filter options for a combination of block size and intra-prediction mode may be based on off-line training with different training video data. For simplicity, the number of filters may be 3, filter 0, filter 1, and filter 2, where filter 0 indicates an all-pass filtering (i.e., no filtering). Using the candidate filters, a most probable filter table may be generated according to the following table, which is represented in pseudocode:

```
// Most probable filter table
{
    {0,0,0,0,0,0,0,0,0,0,0,0,0,0,0,0,0,0,0,0,0,0,0,
0,0,0,0,0,0,0,0,0,0,0,0,0},//2×2
    {0,0,0,1,0,0,1,0,0,1,0,0,0,0,0,0,0,0,0,0,0,0,0,
0,0,0,0,0,0,0,0,0,0,0,0,0},//4×4
```

-continued

```
    {0, 0, 0, 1, 1, 2, 2, 2, 1, 1, 0, 0, 0, 0, 0, 0, 0, 0, 0, 0, 0, 0, 0, 0, 0,
0, 0, 0, 0, 0, 0, 0, 0, 0, 0, 0, 0, 0, 0, 0}, //8×8
    {0, 0, 0, 2, 2, 2, 2, 2, 2, 2, 2, 2, 2, 2, 2, 2, 2, 2, 2, 0, 0, 0, 0, 0, 0, 0,
0, 0, 0, 0, 0, 0, 0, 0, 0, 0, 0, 0, 0, 0}, //16×16
    {0, 0, 0, 2, 2, 2, 2, 2, 2, 2, 2, 2, 2, 2, 2, 2, 2, 2, 2, 2, 2, 2, 2, 2, 2,
2, 2, 2, 2, 2, 2, 2, 2, 0, 0, 0, 0, 0, 0}, //32×32
    {0, 0, 0, 2, 2, 0, 0, 0, 0, 0, 0, 0, 0, 0, 0, 0, 0, 0, 0, 0, 0, 0, 0, 0, 0,
0, 0, 0, 0, 0, 0, 0, 0, 0, 0, 0, 0, 0, 0, 0}, //64×64
    {0, 0, 0, 2, 2, 0, 0, 0, 0, 0, 0, 0, 0, 0, 0, 0, 0, 0, 0, 0, 0, 0, 0, 0, 0,
0, 0, 0, 0, 0, 0, 0, 0, 0, 0, 0, 0, 0, 0, 0} //128×128
}
```

In the example above, the most probable smoothing filter may be defined for each block size and intra-prediction mode. The table index of a smoothing filter for a specific combination may be defined as [S, M] corresponding to size and mode. The block size may range from 1 to 7, corresponding to block sizes 2×2, 4×4, 8×8, 16×16, 32×32, 64×64, and 128×128, for example. The intra-prediction mode may range from 1 to 40, for example. However, in the example of this disclosure, only 35 modes are defined, and therefore, the rest of the modes are populated with 0, indicating filter 0 or all-pass filter. The example of the table above shows for each entry in the table a smoothing filter from the example set of filters (0, 1, 2). The intra-prediction modes for which a smoothing filter 1 or 2 is applied correspond to the combinations defined in TABLE 3 above.

In one example, during encoding, video encoder 20 may implement fixed mode-dependent intra-predictive coding, where video encoder 20 selects the most probable smoothing filter for each combination of block size and intra-prediction mode as defined by the table above. In this example, video encoder 20 may indicate the fixed mode-dependent intra-predictive coding, without having to encode which smoothing filter is used for a block. During decoding, if fixed mode-dependent intra-predictive coding is indicated, the decoder (e.g., video decoder 30) may determine which smoothing filter to apply using information from the table above based on the block size and intra-prediction mode information used as an index for the table. For example, an 8×8 block encoded using intra-prediction mode 6 may correspond to Filter1([3, 6]) which is smoothing filter 2. Filter1 may indicate that the information is obtained from the table corresponding to the most probable filter table.

In some cases, using the fixed mode-dependent intra-predictive coding may not yield the best results for some of the larger block sizes, e.g., 64×64 and 128×128. In one example, during intra-predictive encoding of a block, video encoder 20 may determine whether or not to apply a smoothing filter to predictive samples using adaptive mode-dependent intra-predictive coding. For blocks smaller than a threshold size, e.g., 64×64, video encoder 20 may utilize the most probable filter table shown above. For blocks larger than or equal to the threshold, e.g., 64×64 blocks and larger, video encoder 20 may evaluate the results for applying different smoothing filters including no filter to the predictive samples, and determine which yields better results. The results may be determined based on a quality metric or a rate-distortion metric. The rate portion of the metric may be indicative of the coding rate of the current block, and the distortion portion of the metric may be indicative of the amount of distortion in the current block. The rate-distortion metric may be based on rate, distortion, or a combination of both.

In one example, the evaluation of applying different smoothing filters may be based on the coding rate associated with applying each of the filters to the current block. The coding rate may be proportional to the amount of residual data corresponding to the current block when a smoothing filter is used. The larger the amount of residual data, the higher the coding rate for the current block. The smoothing filter that results in a smaller amount of residual data, and therefore, a better coding rate, may be considered the filter that yields better results.

In another example, the evaluation of applying different smoothing filters may be based on the amount of distortion associated with applying each of the filters to the current block. In one example, the amount of distortion may be determined based on a mean square error value between the prediction block and the original block. The prediction block may be the result of using prediction samples obtained by applying a selected smoothing filter. The smoothing filter that results in a smaller mean square error value, and therefore, less distortion, may be considered the filter that yields better results.

In one example, video encoder 20 may compare results of applying the filter specified by the most probable filter table shown above with filters specified by a second most probable filter table, shown below, which is represented in pseudocode:

```
// Second most probable filter table
{
    {0, 0, 0, 0, 0, 0, 0, 0, 0, 0, 0, 0, 0, 0, 0, 0, 0, 0, 0, 0, 0, 0, 0, 0, 0,
0, 0, 0, 0, 0, 0, 0, 0, 0, 0, 0, 0, 0, 0, 0}, //2×2
    {1, 1, 1, 0, 1, 1, 0, 1, 1, 0, 1, 1, 1, 1, 1, 1, 1, 1, 1, 1, 1, 1, 1, 1, 1,
1, 1, 1, 1, 1, 1, 1, 1, 1, 1, 1, 1, 1, 1, 1}, //4×4
    {1, 1, 1, 0, 0, 0, 0, 0, 0, 0, 1, 1, 1, 1, 1, 1, 1, 1, 1, 1, 1, 1, 1, 1, 1,
1, 1, 1, 1, 1, 1, 1, 1, 1, 1, 1, 1, 1, 1, 1}, //8×8
    {2, 2, 2, 0, 0, 0, 0, 0, 0, 0, 0, 0, 0, 0, 0, 0, 0, 2, 2, 2, 2, 2, 2, 2, 2,
2, 2, 2, 2, 2, 2, 2, 2, 2, 2, 2, 2, 2, 2, 2}, //16×16
    {2, 2, 2, 0, 0, 0, 0, 0, 0, 0, 0, 0, 0, 0, 0, 0, 0, 0, 0, 0, 0, 0, 0, 0, 0,
0, 0, 0, 0, 0, 0, 0, 2, 2, 2, 2, 2, 2, 2, 2}, //32×32
    {2, 2, 2, 0, 0, 2, 2, 2, 2, 2, 2, 2, 2, 2, 2, 2, 2, 2, 2, 2, 2, 2, 2, 2, 2,
2, 2, 2, 2, 2, 2, 2, 2, 2, 2, 2, 2, 2, 2, 2}, //64×64
    {2, 2, 2, 0, 0, 2, 2, 2, 2, 2, 2, 2, 2, 2, 2, 2, 2, 2, 2, 2, 2, 2, 2, 2, 2,
2, 2, 2, 2, 2, 2, 2, 2, 2, 2, 2, 2, 2, 2, 2} //128×128
}
```

In some examples, more tables may be used to specify other filters. In the simple example of using a most probable filter table and a second most probable filter table, the entries corresponding to non-zero filters, e.g., filters 1 and 2, in the first table may be replaced with filter 0 in the second table, and vice versa. In this manner, the comparison between the most probable and the second most probable filter is between filtering and non-filtering. If the filtering option that yields the better result is the one specified in the most probable filter table, then video encoder 20 may not need to indicate anything, as the decoder assumes the most probable filter is used if not specified otherwise. If the filtering option that yields the better result is the one specified in the second most probable filter table, video encoder 20 may signal a filtering mode to indicate that a filter other than the most probable filter should be applied during decoding. The filter tables may be stored in a memory unit (not shown) associated with video encoder 20, and accessed by intra-prediction unit 46 during coding.

The signaling of the filtering mode may be done in several ways. In one example, video encoder 20 may use a filtering mode flag to signal whether filtering other than what is specified in the most probable filter table is used for a certain block. In examples where there are more than two filter tables used, e.g., there is a third (or more) most probable filter tables, video encoder 20 may indicate which of the second or third (or more) most probable filter tables is used for a certain block. In yet another example, signaling may be based on a combination of contextual information, such as, the block size of the current block, the prediction mode, and the filtering mode of neighboring blocks. The contextual information may be used to create a VLC table or CABAC table that entropy code a signal as to whether filtering was used for a current block. In this manner, the decoder may determine based on contextual information whether filtering should or should not be used with a block, and use the VLC table or CABAC information to determine the filtering mode.

In other examples, other techniques may be utilized to determine whether to apply a smoothing filter. The smoothing filter techniques of this disclosure may provide an intra smoothing filtering mode decision (whether to filter or not) based on statistics of a bit rate-distortion metric as a function of the combination of intra prediction mode and block size.

Referring again to FIG. 2B, it illustrates the intra prediction modes and PU size combinations, which are candidates for intra smoothing filtering based on a comparison between statistics of the filtered and unfiltered intra smoothing modes. For example, the statistics indicate that the vertical (mode 0) and horizontal (mode 1) prediction directions are candidates for intra smoothing filtering for PU size 32×32 and the main diagonal intra prediction directions (modes 3, 6, 9) are candidates for intra smoothing filtering for PU sizes 32×32, 16×16, 8×8, and 4×4. The statistics may also indicate that the intra prediction directions in between the horizontal or vertical intra prediction directions and the main diagonal directions are candidates for intra smoothing filtering at progressively smaller PU sizes. For the DC mode, the statistics may indicate that mode 2, the DC mode, is not a candidate for intra smoothing filtering, while the planar mode (mode 34) is a candidate for intra smoothing filtering at certain PU sizes, e.g., 8×8, 16×16, and 32×32.

Although the statistics may indicate what intra prediction modes and what PU sizes are candidates for intra smoothing filtering, coding efficiency experiments may demonstrate that the intra smoothing filtering candidate assignment shown in FIG. 2B may not be optimal in a rate-distortion sense. Therefore, the intra smoothing candidates of FIG. 2B may be a "template pattern" for deriving "subset patterns" with higher coding efficiency. In one example, a "subset pattern" is defined by selecting candidates for intra smoothing filtering from the "template pattern" per infra prediction mode and per PU size, or alternatively no intra smoothing filtering for any PU size corresponding to a certain intra prediction mode. TABLES 4-7 below provide some examples of subset patterns. TABLES 4-7 may be generally referred to as filtering decision tables.

In each of TABLES 4-7, "1" may indicate that intra smoothing filtering is applied to the corresponding intra prediction mode and block size. Therefore, "1" in a particular column and row position indicates that intra smoothing is applied in the case of an intra prediction mode and block size that map to those column and row positions, respectively. In one example, TABLE 4 may correspond to the "template pattern," and each of TABLES 5-7 may correspond to a different "subset pattern." In another example, TABLE 7 may correspond to the "template pattern," and each of TABLES 4-6 may correspond to a different "subset pattern." The "template pattern" may correspond to FIG. 2B, and is illustrated by TABLE 4, for example, which also shows 64×64 PU size for generalization. TABLES 5-7 may represent "subset patterns" In one example of this disclosure, TABLE 7 may represent the "subset pattern" that is suited for general video sequences based on coding efficiency experiments.

TABLE 4

| PU | \multicolumn{18}{c}{Mode} |
|---|---|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 | 16 | 17 |
| 4 × 4 | | | | 1 | | | 1 | | | 1 | | | | | | | | |
| 8 × 8 | | | | 1 | 1 | 1 | 1 | 1 | 1 | 1 | 1 | | | 1 | 1 | | | 1 |
| 16 × 16 | | | | 1 | 1 | 1 | 1 | 1 | 1 | 1 | 1 | 1 | 1 | 1 | 1 | 1 | 1 | 1 |
| 32 × 32 | 1 | 1 | | 1 | 1 | 1 | 1 | 1 | 1 | 1 | 1 | 1 | 1 | 1 | 1 | 1 | 1 | 1 |
| 64 × 64 | 1 | 1 | | 1 | 1 | 1 | 1 | 1 | 1 | 1 | 1 | 1 | 1 | 1 | 1 | 1 | 1 | 1 |

| PU | \multicolumn{17}{c}{Mode} |
|---|---|---|---|---|---|---|---|---|---|---|---|---|---|---|---|---|---|
| | 18 | 19 | 20 | 21 | 22 | 23 | 24 | 25 | 26 | 27 | 28 | 29 | 30 | 31 | 32 | 33 | 34 |
| 4 × 4 | 1 | | | | | | | 1 | 1 | | | | | | 1 | | |
| 8 × 8 | 1 | 1 | | | | | 1 | 1 | 1 | 1 | | | | | 1 | 1 | 1 |
| 16 × 16 | 1 | 1 | 1 | 1 | 1 | 1 | 1 | 1 | 1 | 1 | 1 | 1 | 1 | 1 | 1 | 1 | 1 |
| 32 × 32 | 1 | 1 | 1 | 1 | 1 | 1 | 1 | 1 | 1 | 1 | 1 | 1 | 1 | 1 | 1 | 1 | 1 |
| 64 × 64 | 1 | 1 | 1 | 1 | 1 | 1 | 1 | 1 | 1 | 1 | 1 | 1 | 1 | 1 | 1 | 1 | 1 |

TABLE 5

| PU | \multicolumn{18}{c}{Mode} |
|---|---|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 | 16 | 17 |
| 4 × 4 | | | | | | | | | | | | | | | | | | |
| 8 × 8 | | | | 1 | | 1 | | | 1 | 1 | | | | 1 | 1 | | | 1 |
| 16 × 16 | | | | 1 | 1 | 1 | 1 | 1 | 1 | 1 | 1 | 1 | 1 | 1 | 1 | 1 | 1 | 1 |
| 32 × 32 | | | | 1 | 1 | 1 | 1 | 1 | 1 | 1 | 1 | 1 | 1 | 1 | 1 | 1 | 1 | 1 |
| 64 × 64 | | | | | | | | | | | | | | | | | | |

TABLE 5-continued

| | Mode | | | | | | | | | | | | | | | | |
|---|---|---|---|---|---|---|---|---|---|---|---|---|---|---|---|---|---|
| PU | 18 | 19 | 20 | 21 | 22 | 23 | 24 | 25 | 26 | 27 | 28 | 29 | 30 | 31 | 32 | 33 | 34 |
| 4 × 4 | | | | | | | | | | | | | | | | | |
| 8 × 8 | 1 | | | | | | | 1 | 1 | | | | | | | 1 | 1 |
| 16 × 16 | 1 | 1 | 1 | | | 1 | 1 | 1 | 1 | 1 | 1 | | | 1 | 1 | 1 | 1 |
| 32 × 32 | 1 | 1 | 1 | 1 | 1 | 1 | 1 | 1 | 1 | 1 | 1 | 1 | 1 | 1 | 1 | 1 | 1 |
| 64 × 64 | | | | | | | | | | | | | | | | | |

TABLE 6

| | Mode | | | | | | | | | | | | | | | | | |
|---|---|---|---|---|---|---|---|---|---|---|---|---|---|---|---|---|---|---|
| PU | 0 | 1 | 2 | 3 | 4 | 5 | 6 | 7 | 8 | 9 | 10 | 11 | 12 | 13 | 14 | 15 | 16 | 17 |
| 4 × 4 | | | | | | | | | | | | | | | | | | |
| 8 × 8 | | | | 1 | | | 1 | | | 1 | | | | | | | | |
| 16 × 16 | | | | 1 | 1 | 1 | 1 | 1 | 1 | 1 | 1 | 1 | 1 | 1 | 1 | 1 | 1 | 1 |
| 32 × 32 | | | | 1 | 1 | 1 | 1 | 1 | 1 | 1 | 1 | 1 | 1 | 1 | 1 | 1 | 1 | 1 |
| 64 × 64 | | | | | | | | | | | | | | | | | | |

| | Mode | | | | | | | | | | | | | | | | |
|---|---|---|---|---|---|---|---|---|---|---|---|---|---|---|---|---|---|
| PU | 18 | 19 | 20 | 21 | 22 | 23 | 24 | 25 | 26 | 27 | 28 | 29 | 30 | 31 | 32 | 33 | 34 |
| 4 × 4 | | | | | | | | | | | | | | | | | |
| 8 × 8 | 1 | | | | | | | 1 | 1 | | | | | | | 1 | 1 |
| 16 × 16 | 1 | 1 | 1 | | | 1 | 1 | 1 | 1 | 1 | 1 | | | 1 | 1 | 1 | 1 |
| 32 × 32 | 1 | 1 | 1 | 1 | 1 | 1 | 1 | 1 | 1 | 1 | 1 | 1 | 1 | 1 | 1 | 1 | 1 |
| 64 × 64 | | | | | | | | | | | | | | | | | |

TABLE 7

| | Mode | | | | | | | | | | | | | | | | | |
|---|---|---|---|---|---|---|---|---|---|---|---|---|---|---|---|---|---|---|
| PU | 0 | 1 | 2 | 3 | 4 | 5 | 6 | 7 | 8 | 9 | 10 | 11 | 12 | 13 | 14 | 15 | 16 | 17 |
| 4 × 4 | | | | | | | | | | | | | | | | | | |
| 8 × 8 | | | | 1 | | | 1 | | | 1 | | | | | | | | |
| 16 × 16 | | | | 1 | 1 | 1 | 1 | 1 | 1 | 1 | 1 | 1 | 1 | 1 | 1 | 1 | 1 | 1 |
| 32 × 32 | | | | 1 | 1 | 1 | 1 | 1 | 1 | 1 | 1 | 1 | 1 | 1 | 1 | 1 | 1 | 1 |
| 64 × 64 | | | | | | | | | | | | | | | | | | |

| | Mode | | | | | | | | | | | | | | | | |
|---|---|---|---|---|---|---|---|---|---|---|---|---|---|---|---|---|---|
| PU | 18 | 19 | 20 | 21 | 22 | 23 | 24 | 25 | 26 | 27 | 28 | 29 | 30 | 31 | 32 | 33 | 34 |
| 4 × 4 | | | | | | | | | | | | | | | | | |
| 8 × 8 | | | | | | | | | | | | | | | | | 1 |
| 16 × 16 | 1 | 1 | 1 | | | 1 | 1 | 1 | 1 | 1 | | | | 1 | 1 | 1 | 1 |
| 32 × 32 | 1 | 1 | 1 | 1 | 1 | 1 | 1 | 1 | 1 | 1 | 1 | 1 | 1 | 1 | 1 | 1 | 1 |
| 64 × 64 | | | | | | | | | | | | | | | | | |

After prediction unit 41 generates the predictive block or PU for the current video block (inter- or intra-coded), video encoder 20 forms a residual video block by subtracting the predictive block from the current video block. Summer 50 represents the component or components that perform this subtraction operation. Transform unit 52 may form one or more transform units (TUs) from the residual block. Transform unit 52 applies a transform, such as a discrete cosine transform (DCT) or a conceptually similar transform, to the TU, producing a video block comprising residual transform coefficients. The transform may convert the residual block from a pixel domain to a transform domain, such as a frequency domain.

Transform unit 52 may perform other transforms, such as those defined by the HM, which are conceptually similar to DCT. Wavelet transforms, integer transforms, sub-band transforms or other types of transforms could also be used. In any case, transform unit 52 applies the transform to the residual block, producing a block of residual transform coefficients. The transform may convert the residual information from a pixel value domain to a transform domain, such as a frequency domain.

Transform unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy coding unit 56 entropy codes the quantized transform coefficients. For example, entropy coding unit 56 may perform context adaptive variable length coding (CAVLC), context adaptive binary arithmetic coding (CABAC), or another entropy coding technique. Following the entropy coding by entropy coding unit 56, the encoded video may be transmitted to another device (e.g., video decoder 30), or archived for later transmission or retrieval.

In some cases, entropy coding unit 56 or another unit of video encoder 20 may be configured to perform other coding functions, in addition to entropy coding. For example, entropy coding unit 56 may be configured to determine the CBP values for the macroblocks and partitions. Also, in some cases, entropy coding unit 56 may perform run length coding of the coefficients in a macroblock or partition thereof. In particular, entropy coding unit 56 may apply a zig-zag scan or other scan pattern to scan the transform coefficients in a macroblock or partition and encode runs of zeros for further compression. Entropy coding unit 56 may also construct header information that includes appropriate syntax elements for transmission in the encoded video bitstream. To entropy encode the syntax elements, entropy encoding unit 56 may perform CABAC and binarize the syntax elements into one or more binary bits based on a context model. Entropy encoding unit may also perform CAVLC and encode the syntax elements as codewords according to probabilities based on context.

In accordance with the techniques of this disclosure, entropy coding unit 56 may be configured to encode an indication that a smoothing filter other than the most probable filter is applied to prediction samples during intra-predictive coding. When the filtering decision for a block is the same as that specified in the most probable filter table, video encoder 20 may not send an indication to the decoder, and therefore, no additional information may need to be encoded. When an indication is needed, e.g., when the filtering decision for a block is specified in the second (or more) most probable filter table, video encoder 20 may encode an indication regarding filtering. Additionally, video encoder 20 may encode the intra-prediction mode used in encoding the block. Entropy coding unit 56 may encode the indication (e.g., intra-prediction mode and filtering decision, when applicable) using CABAC. Furthermore, entropy coding unit 56 may use context information for performing CABAC to encode the indication that indicates the intra-prediction mode for a block and filtering information when the second (or more) most probable filter is applied to the prediction samples.

Inverse quantization unit 58 and inverse transform unit 60 apply inverse quantization and inverse transformation, respectively, to reconstruct the residual block in the pixel domain for later use as a reference block of a reference frame. Motion compensation unit 44 may calculate a reference block by adding the residual block to a predictive block of one of the frames of reference frame store 64. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reconstructed video block for storage in reference frame store 64. The reconstructed video block may be used by motion estimation unit 42 and motion compensation unit 44 as a reference block to inter-predict a block in a subsequent video frame.

Figure 5:
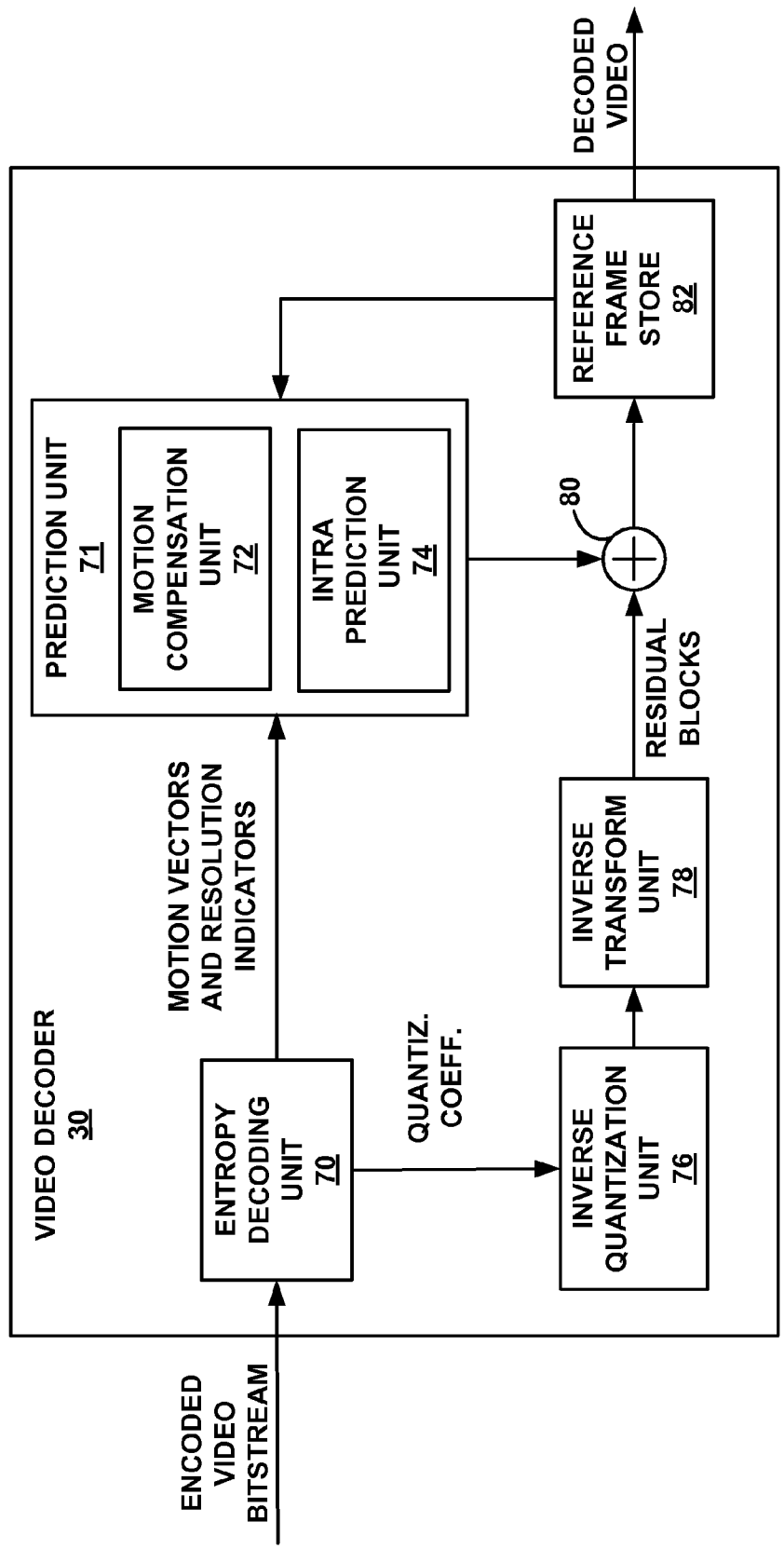
FIG. 5 is a block diagram illustrating an example of a video decoder, which decodes an encoded video sequence.

FIG. 5 is a block diagram illustrating an example of video decoder 30, which decodes an encoded video sequence. In the example of FIG. 5, video decoder 30 includes an entropy decoding unit 70, prediction unit 71, inverse quantization unit 76, inverse transformation unit 78, reference frame store 82 and summer 80. Prediction unit 71 includes motion compensation unit 72 and intra prediction unit 74. Video decoder 30 may, in some examples, perform a decoding pass generally reciprocal to the encoding pass described with respect to video encoder 20 (FIG. 4). Prediction unit 71 may generate prediction data based on information received from entropy decoding unit 70. When inter-predictive coding is indicated, motion compensation unit 72 may generate prediction data based on motion vectors received from entropy decoding unit 70. When intra-predictive coding is indicated, intra prediction unit 74 may generate prediction data for a current block of a current frame based on an indicated intra-prediction mode and data from previously-decoded blocks of the current frame.

Video decoder 30 may receive an encoded video bitstream, e.g., via network, broadcast, or from a physical medium. The encoded bitstream may include entropy coded video data. Entropy decoding unit 70 of video decoder 30 entropy-decodes the bitstream to generate quantized coefficients, motion vectors, and prediction data. Entropy decoding unit 70 forwards the motion vectors and prediction data to prediction unit 71.

In accordance with the techniques of this disclosure, the entropy-coded video data may include an entropy-coded indication of the intra-prediction mode used in coding the current block. Entropy-coded video data may also include an entropy-coded indication of filtering, indicating a smoothing filter decision. In one example, the filtering indication may be used to indicate that the most probable filter table was not used to select the smoothing filter during intra-predictive coding of the current block. When entropy-coded video data does not include a filtering indication, the no indication implies that the most probable filter table was used to select the smoothing filter during intra-predictive coding of the current block. The entropy coded video data may also include block size information, which entropy decoding unit 70 may use along with the intra-prediction mode as context information when entropy decoding the filtering indication for the intra-predictive coded block. In this manner, entropy decoding unit 70 may decode the indication of filtering (e.g., whether or not a smoothing filter is applied) and send the indication to intra prediction unit 74.

Motion compensation unit 72 may use motion vectors received in the bitstream to identify a prediction block in reference frames in reference frame store 82. Intra prediction unit 74 may use intra-prediction modes received in the bitstream to form a prediction block from spatially adjacent blocks. Inverse quantization unit 76 inverse quantizes, i.e., de-quantizes, the quantized block coefficients provided in the bitstream and decoded by entropy decoding unit 70. The inverse quantization process may include a conventional process, e.g., as defined by the H.264 decoding standard. The inverse quantization process may also include use of a quantization parameter $QP_Y$ calculated by video encoder 20 for each video block or CU to determine a degree of quantization and, likewise, a degree of inverse quantization that should be applied. Inverse transform unit 78 applies an inverse transform, e.g., an inverse DCT, an inverse integer transform, or a conceptually similar inverse transform process, to the transform coefficients in order to produce residual blocks in the pixel domain.

Motion compensation unit 72 may also perform interpolation based on interpolation filters. Motion compensation unit 72 may use interpolation filters as used by video encoder 20 during encoding of the video block to calculate interpolated values for sub-integer pixels of a reference block. Motion compensation unit 72 may determine the interpolation filters used by video encoder 20 from the received syntax elements and use the interpolation filters to produce predictive blocks.

Motion compensation unit 72 uses some of the syntax information to determine sizes of LCUs and CUs used to encode frame(s) and/or slice(s) of the encoded video sequence, partition information that describes how each macroblock of a frame of the encoded video sequence is partitioned, modes indicating how each partition is encoded, one or more reference frames (and reference frame lists) for each inter-encoded CU, and other information to decode the encoded video sequence.

Intra prediction unit 74 may also determine whether or not to apply a smoothing filter to the prediction samples when performing a prediction block. Intra prediction unit 74 may make the determination as to whether or not to apply the smoothing filter based on the block size and the corresponding intra-prediction mode. If no filtering indication is signaled, intra prediction unit 74 may determine filtering based on what is specified in the most probable filter table (shown above) for the block size and intra-prediction mode combination. If a filtering indication is signaled, intra prediction unit 74 may determine that the filtering decision is not based on the most probable filter table, and may determine filtering based on what is specified in the second most probable filter table (shown above) for the block size and intra-prediction mode combination. In one example, more than one additional filter tables may be provided, e.g., second, third, or more, most probable filter tables. In this example, the filtering indication may also indicate which of the tables should be used to determine which smoothing filter to apply. The filter tables may be stored in a memory unit (not shown) in video decoder 30. Intra prediction unit 74 may access the filter tables from memory during decoding.

Summer 80 sums the residual blocks with the corresponding prediction blocks generated by motion compensation unit 72 or intra prediction unit 74 to form decoded blocks. If desired, a deblocking filter may also be applied to filter the decoded blocks in order to remove blockiness artifacts. The decoded video blocks are then stored in reference frame store 82, which provides reference blocks for subsequent motion compensation and also produces decoded video for presentation on a display device (such as display device 32 of FIG. 1).

Figure 6:
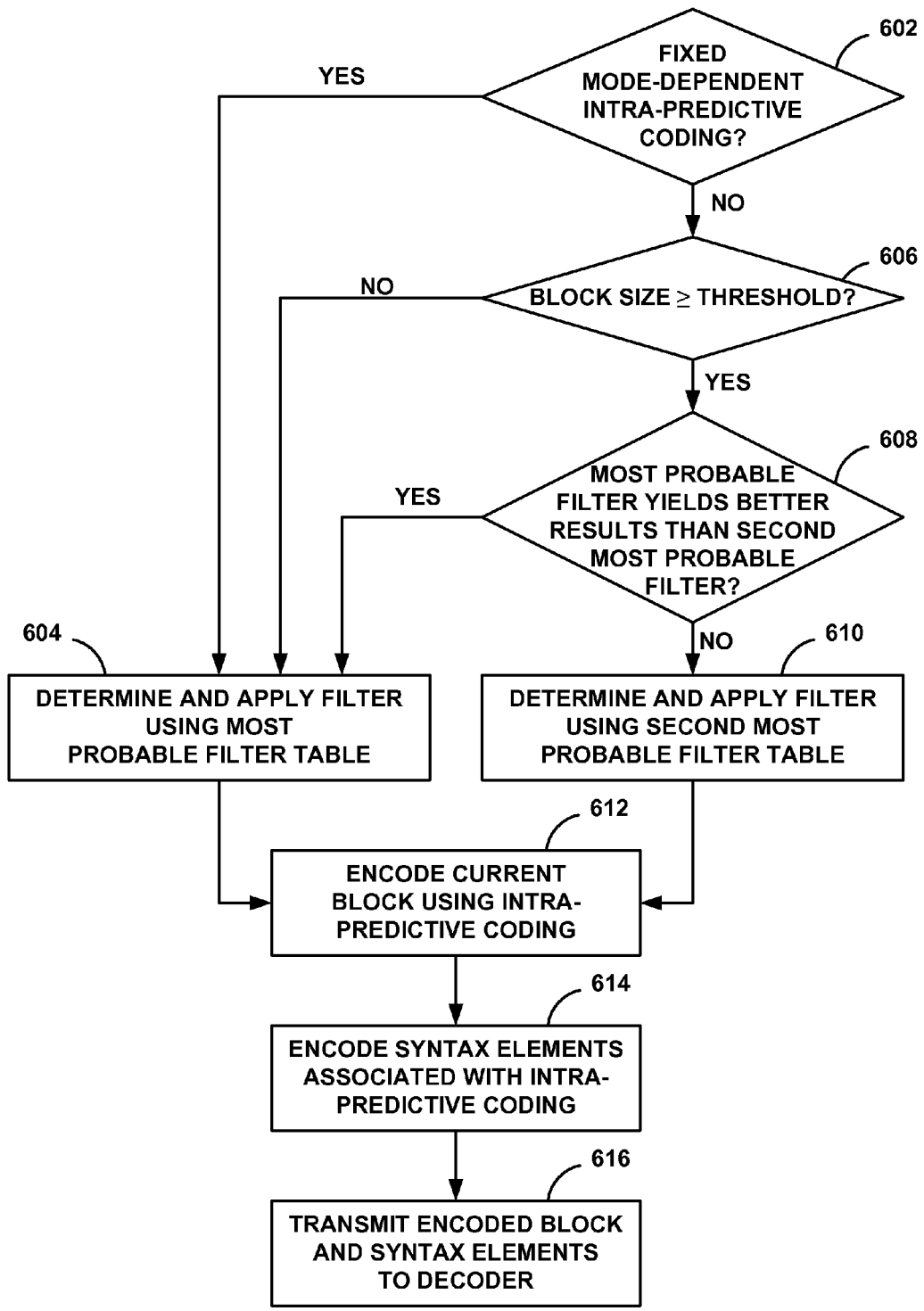
FIG. 6 is a flowchart illustrating an example method for encoding video data in accordance with techniques of this disclosure.

FIG. 6 is a flowchart illustrating an example method for encoding video data in accordance with techniques of this disclosure. Although described with respect to video encoder 20 (FIGS. 1 and 4) for purposes of example, it should be understood that the techniques of FIG. 6 may be performed by any video coding unit. Moreover, the steps illustrated in FIG. 6 may be performed in a different order, certain steps may be omitted, and additional steps may be added, without departing from the techniques of this disclosure.

Video encoder 20 may receive a block (e.g., a CU) of video data to be encoded. When the current block is designated as a block to be encoded using intra-predictive coding, video encoder 20 may determine whether or not to apply a smoothing filter to the prediction samples and determine the smoothing filter if one is to be applied. A smoothing filter may be in some instances applied to the prediction samples, or the predictors, which are used to predict a block in the same frame in intra-predictive coding. Applying the smoothing filter in some cases provides more accurate prediction and minimizes blockiness in the reconstructed predicted frame.

Video encoder 20 may determine whether to operate in fixed mode-dependent intra-predictive coding or adaptive mode-dependent intra-predictive coding (602). In one example, the determination may be done at the sequence or picture level based on content, or based on block size. For example, for large blocks, adaptive mode-dependent intra-predictive coding may be used, and for small blocks, fixed mode-dependent intra-predictive coding may be used. As a result, when large blocks are used, there are fewer blocks to encode within a picture, thus a smaller amount of overhead information, than when small blocks are used. However, fixed mode-dependent intra-predictive coding adds little or no additional overhead information, whereas adaptive mode-dependent intra-predictive coding requires additional overhead information. In this manner, the selected mode may provide a trade-off between the overhead information and performance.

If video encoder 20 is to operate in fixed mode-dependent intra-predictive coding, video encoder 20 may determine whether to apply a smoothing filter based on a filter specified in a filter table, e.g., most probable filter table, selected based on the block size and intra-prediction mode combination and apply the specified filter (604).

In one example, for each of the available intra-prediction modes, e.g., the 35 modes defined by the HM, whether or not a smoothing filter is applied depends on the block size. TABLE 3 above shows the block size and intra-prediction mode combinations for which a smoothing filter is applied. A most probable filter table (shown above) may be generated based on the block size and intra-prediction mode combinations. Each of the entries of the table may indicate a filter that should be applied for the corresponding index, where the index is associated with a block size and an intra-prediction mode. Each of the filters specified in the table may be from a filter set, where the filter set may vary from one stream to another, one group of frames to another, one frame or slice to another, and so forth. For simplicity, an all-pass filter may be identified for entries where no smoothing filter needs to be applied.

If video encoder 20 is to operate in an adaptive mode-dependent intra-predictive coding, video encoder 20 may determine whether the block size is equal to or above a threshold block size, e.g., 64×64 (606). If the block size is less than the threshold block size, then video encoder 20 may apply the filter specified by the most probable filter table and determine whether or not to apply a smoothing filter based on block size and intra-prediction mode (604). If the block size is equal to or greater than the threshold block size, video encoder 20 may determine whether applying a filter according to the most probable filter table yields better results than applying a filter according to a second most probable filter table (608). Therefore, video encoder 20 may apply the corresponding filter from the first table to block, apply the corresponding filter from the second table to the block, and evaluate the results of applying the two filters by comparing them to each other to determine which yields better results.

In one example, for each block size and intra-prediction mode combination applying a filter according to one of the tables may be the same as not applying a filter at all, or in this example, applying an all-pass filter. Therefore, in reality, the comparison of applying a filter according to the most probable filter table and applying a filter according to the second most probable filter table may be the same as comparing the results of applying a filter or not applying a filter.

If applying the filter according to the most probable filter table yields the better results, video encoder 20 may determine and apply the filter specified by the most probable filter table based on the block size and intra-prediction mode combination associated with the current block (604). If applying the filter according to the second most probable filter tables yields the better results, video encoder 20 may determine and apply the filter specified by the second most probable filter table based on the block size and intra-prediction mode combination associated with the current block (610). In some examples, when there are more than 2 most probable filter tables, e.g., third or more, the comparison among the results of applying all the possible filters may be compared to determine which filter table to use to select a smoothing filter to apply to the prediction samples. In some examples, a plurality of filtering decision tables, e.g., TABLES 4-7 above, may be used, where one table may be considered the "template pattern" and the remaining tables may be considered alternative tables or "subset patterns" providing alternative filtering option, as described above.

Video encoder 20 may then encode the current block by applying the selected smoothing filter to the prediction samples and performing intra-predictive coding according to the intra-prediction mode associated with the current block (612). Video encoder 20 may also encode syntax elements associated with intra-predictive coding with the current block (614), e.g., one or more syntax elements that identify the intra-prediction mode. Other examples of syntax elements associated with intra-predictive coding that may be encoded with a block may be the partition type associated with the block, PU size, TU size, CBP, and quantized coefficients. If the applied smoothing filter decision was not based on the most probable filter table or the "template pattern," e.g., the filtering decision was made using the second most probable filter table or other "subset patterns," video encoder 20 may also encode syntax elements indicating that the most probable filter table was not used to signal that the block was not encoded using fixed mode-dependent intra-predictive coding. For example, if TABLE 7 above is the "template pattern" and TABLES 4-6 are the "subset patterns," video encoder may encode syntax elements indicative of the "subset pattern" table used, when one is used instead of the "template pattern" table. Video encoder 20 may then transmit the encoded video block, within an encoded video frame, and with the syntax elements to a video decoder (616).

Figure 7:
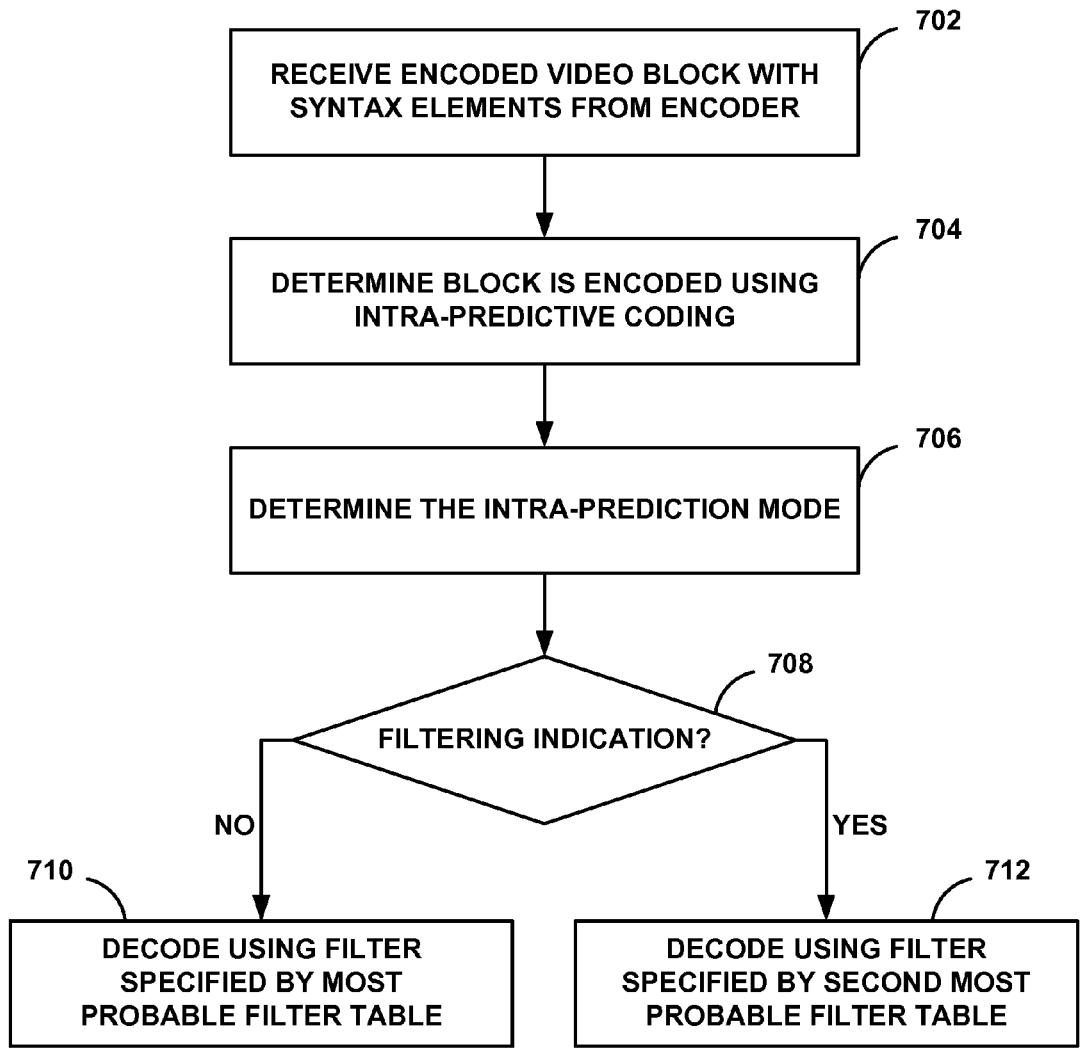
FIG. 7 is a flowchart illustrating an example method for decoding video data in accordance with techniques of this disclosure.

FIG. 7 is a flowchart illustrating an example method for decoding video data in accordance with the techniques of this disclosure. Although described with respect to video decoder 30 (FIGS. 1 and 5) for purposes of example, it should be understood that the techniques of FIG. 7 may be performed by any video coding unit. Moreover, the steps illustrated in FIG. 7 may be performed in a different order, certain steps may be omitted, and additional steps may be added, without departing from the techniques of this disclosure.

Video decoder 30 may receive an encoded block (e.g., a CU) of video data to be decoded (702). Video decoder 30 may decode the encoded video block and syntax elements to determine that the block is encoded using intra-predictive coding (704). Based on the syntax elements, video decoder 30 may also determine the intra-prediction mode of the block (706). Video decoder 30 may determine if the syntax elements include a filtering indication (708).

If there is no filtering indication, video decoder 30 may then decode the block using intra-predictive coding, and apply a smoothing filter option as specified by the most probable filter table (710). If there is a filtering indication, video decoder 30 may then decode the block using intra-predictive coding, and applying a smoothing filter option as specified by the second most probable filter table (712). In either case, whether using the most probable filter table or the second most probable filter table, video decoder 30 may determine the filter based on the block size and the intra-prediction mode combination associated with the current block. In some examples, multiple tables may define second (or more) probable filters or there may be multiple "subset pattern" filters, and the filtering indication may indicate the "subset pattern" table used alternatively to the most probable filter table or "template pattern" table.

In this manner, video decoder 30 may not need to make any determinations regarding which filtering options provide the better results. If no indication is signaled by the encoder, then video decoder 30 assumes the most probable filter table or "template pattern" table was used, otherwise, any type of signaling indicates that the second most probable filter table was used. In some examples, where more than two filter tables are used, e.g., third (or more) most probable filter tables or "subset patterns," the filtering indication may identify which of the additional tables was used in selecting a smoothing filter.

As discussed above, intra smoothing filtering may be utilized for large PU sizes as illustrated by FIG. 2B and TABLE 4, for example. Intra smoothing filtering may also be utilized for most PU sizes for intra prediction modes corresponding to true diagonal directions (i.e., +/−45 and +/−135 degrees) or modes 3, 6, 9, while intra smoothing filtering may not be utilized for smaller PU sizes in case of the vertical (mode 0) and horizontal (mode 1) directions. For the intra prediction directions between the diagonal directions and respectively the horizontal or vertical directions, intra predictive filtering may be less likely utilized for small PU sizes when the direction is close to horizontal or vertical directions, while more likely to be utilized for small PU sizes when the direction is close to the diagonal directions, as illustrated in FIG. 2B and TABLE 4. In one example, an encoder and a decoder according to the techniques of this disclosure may apply intra smoothing filtering according to the "subset patterns" specified by TABLE 7, shown above. In one example, for the DC mode (mode 2), intra smoothing filtering may not be utilized for any PU size. Also, for planar mode (mode 34), intra smoothing filtering may be utilized with larger PU sizes.

The encoder and decoder may apply intra smoothing filtering according to a "subset pattern" that is derived from the "template pattern" (TABLE 4), which specifies for each PU size and intra prediction mode combination whether or not intra smoothing filtering is performed. A "subset pattern" may be derived by selecting candidates for intra smoothing filtering from the "template pattern" per intra prediction mode and per PU size, or alternatively no intra smoothing filtering for any PU size corresponding to that intra prediction mode. A "subset pattern" derived from the "template pattern" may have certain characteristics such as, for example, for each intra prediction mode, intra smoothing filtering is not applied at least for one of the PU sizes, so the encoder has the option of performing intra prediction without intra smoothing. The "subset pattern" may also have certain characteristics such as, for example, for each intra prediction mode, if intra smoothing filtering is not applied at certain PU size, the intra smoothing filtering may not be applied at any smaller PU sizes for that intra prediction mode.

The computation of the prediction samples for each intra prediction mode and PU size combination may be subject to rounding rules, such as rounding down, rounding up, or rounding to the nearest integer. The rounding rules may be modified in the encoder and decoder based on prediction sample location in a deterministic manner, e.g., based on intra prediction mode and PU size, such as interleaving prediction samples with different rounding rules in order to increase coding efficiency. In the example of intra smoothing filtering of the reference samples for intra prediction, intra smoothing filtering may be skipped for certain reference sample locations, e.g., the top-left corner reference sample or other reference sample locations in a deterministic manner (e.g., based on intra prediction mode and PU size) to increase coding efficiency.

In one example, the encoder and/or decoder may store a "subset pattern" as a look-up table (LUT) and access this LUT to determine whether to apply intra smoothing filtering or not for a PU size and intra prediction mode combination associated with the current block. In another example, the encoder and/or decoder may represent a "subset pattern" by a set of conditions used to determine whether to apply intra smoothing filtering for the inputs: PU size and intra prediction mode. In another example, the encoder and/or decoder may represent a "subset pattern" by one or more mathematical equations, which compute whether to apply intra smoothing filtering for the inputs: PU size and intra prediction mode. In another example, the encoder and/or decoder may represent a "subset pattern" by a combination of LUT, set of conditions, and/or set of mathematical equations.

In one example, the "template pattern" (e.g., TABLE 4) or "subset patterns" (e.g., TABLES 5-7) may be expanded to include multiple intra smoothing filter types that can be possibly used for each PU size and intra prediction mode combination. For example, for each combination where intra smoothing filtering is applied, the number in the table may indicate the type of filter to use. In one example, two intra smoothing filters may be defined and represented by "1" and "2." An entry in a table corresponding to a certain row/column position may have no entry, i.e., no filter is applied, or a "1" or a "2" to indicate that intra smoothing filtering is applied and the intra smoothing filter used, i.e., either filter "1" or filter "2."

In some examples, HEVC may support short-distance intra prediction (SDIP) PUs, which may have various rectangular sizes per coding unit (CU). In one example, techniques of this disclosure may be applicable to square and rectangular PUs such as those used in Short-Distance Intra Prediction (SDIP). TABLE 8 below illustrates examples of rectangular PU sizes (in pixels) per CU size of SDIP.

TABLE 8

| Size of CU | Possible PU Size |
| --- | --- |
| CU 32 × 32 | 8 × 32, 32 × 8 |
| CU 16 × 16 | 4 × 16, 16 × 4, 1 × 16, 16 × 1 |
| CU 8 × 8 | 2 × 8, 8 × 2 |

In addition to the techniques discussed above, the techniques of this disclosure may include techniques to improve application of MDIS to rectangular SDIP partitions. For example, applying intra smoothing filtering may depend on the width and/or height of the rectangular SDIP partitions. Techniques to determine dimensions of the SDIP partition, or dimension-determination rules, may be employed to determine a dimension or the dimensions of the partition. For example, such techniques for determining a dimension of the SDIP partition may include determining a minimum or maximum dimension of the partition, mathematical equations that calculate the dimensions of the partition based on other known variables associated with the partition, or conditional checks that may be applied to the width and height of the SDIP partition to determine the dimensions of the partition. In one example, the resulting determined dimension of the partition may be used to determine whether or not to apply intra smoothing filtering, for example, using one of the filtering decision tables described above. For example, the techniques may utilize the dimension to determine whether or not to filter. If in one illustrative example, the minimum dimension is 8 pixels, the filtering decision may be determined based on the table entry associated with 32×32 blocks and the appropriate intra prediction mode associated with the partition currently being processed.

In one example, applying intra smoothing filtering may be based on the intra prediction direction associated with the SDIP partition and/or on the width and/or height of the SDIP partition. For example, when a vertical prediction direction is chosen, the height of the partition may be used in one of the filtering decision tables described above, and in case of a horizontal direction the width may be used in one of the filtering decision tables described above. In another example, horizontal, vertical, and diagonal directions may be separately considered to determine the dimension to be used.

In one example, when the planar mode is utilized for SDIP partitions, dimension-determination techniques, as described above, may be utilized to determine a dimension of a SDIP partition. The determined dimension may be used to determine whether to apply intra smoothing filtering or not, for example, by accessing one of the filtering decision tables described above.

Figure 8:
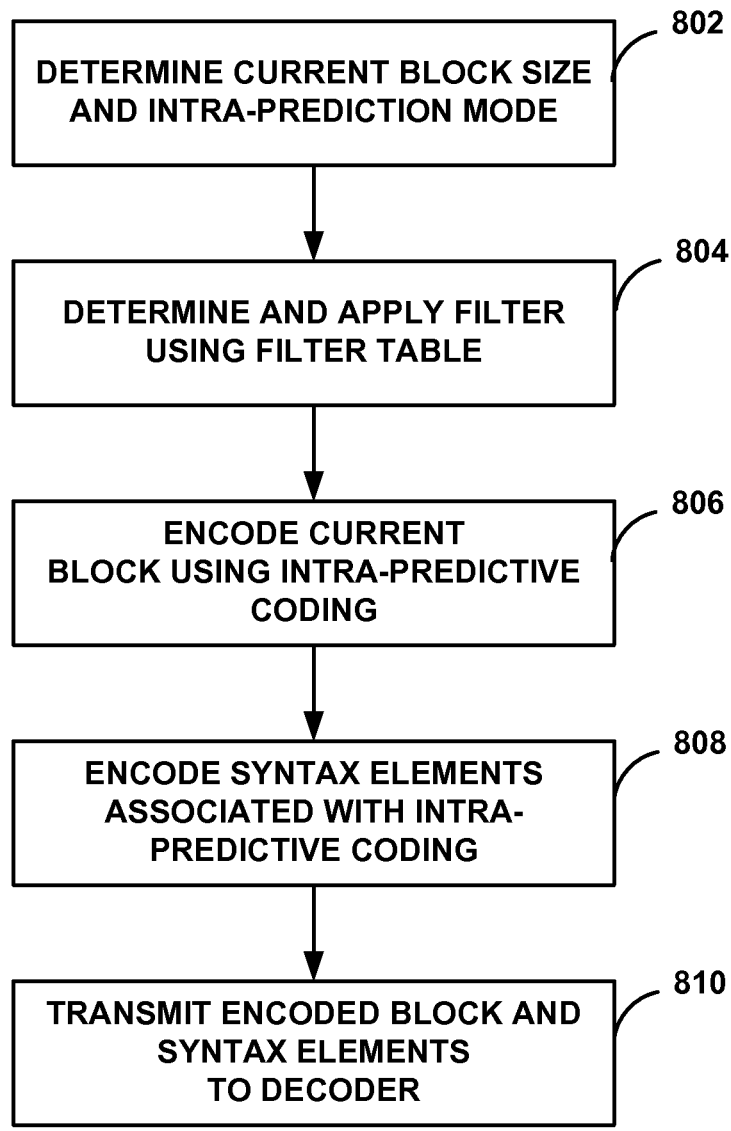
FIG. 8 is a flowchart illustrating another example method for encoding video data in accordance with techniques of this disclosure.

FIG. 8 is a flowchart illustrating another example method for encoding video data in accordance with techniques of this disclosure. Although described with respect to video encoder 20 for purposes of example, it should be understood that the techniques of FIG. 8 may be performed by any video coding unit. Moreover, the steps illustrated in FIG. 8 may be performed in a different order, certain steps may be omitted, and additional steps may be added, without departing from the techniques of this disclosure.

Video encoder 20 may receive a block (e.g., a CU) of video data to be encoded. When the current block is designated as a current block to be encoded using intra-predictive coding, video encoder 20 may determine the current block size and the intra-prediction mode used to encode the current block (802). The video encoder may then determine and apply a smoothing filter using a filter table, e.g., TABLE 7 above, based on the block size and the intra-prediction mode (804), as discussed above.

Video encoder 20 may then encode the current block by applying the selected smoothing filter to the prediction samples and performing intra-predictive coding according to the intra-prediction mode associated with the current block (612). Video encoder 20 may also encode syntax elements associated with intra-predictive coding with the current block (614), e.g., one or more syntax elements that identify the intra-prediction mode. Other examples of syntax elements associated with intra-predictive coding that may be encoded with a block may be the partition type associated with the block, PU size, TU size, CBP, and quantized coefficients. Video encoder 20 may then transmit the encoded video block, within an encoded video frame, and with the syntax elements to a video decoder (616).

Figure 9:
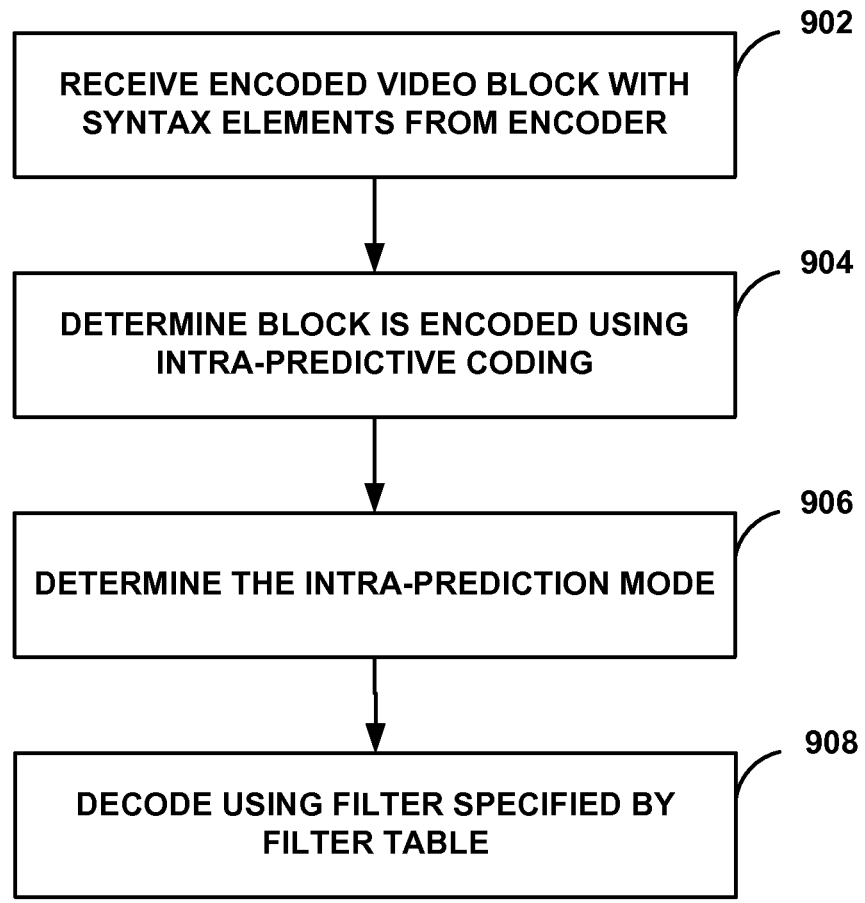
FIG. 9 is a flowchart illustrating another example method for decoding video data in accordance with techniques of this disclosure.

FIG. 9 is a flowchart illustrating another example method for decoding video data in accordance with techniques of this disclosure. Although described with respect to video decoder 30 for purposes of example, it should be understood that the techniques of FIG. 9 may be performed by any video coding unit. Moreover, the steps illustrated in FIG. 9 may be performed in a different order, certain steps may be omitted, and additional steps may be added, without departing from the techniques of this disclosure.

Video decoder 30 may receive an encoded block (e.g., a CU) of video data to be decoded (902). Video decoder 30 may decode the encoded video block and syntax elements to determine that the block is encoded using intra-predictive coding (904). Based on the syntax elements, video decoder 30 may also determine the intra-prediction mode of the block (906). Video decoder 30 may then decode the block using intra-predictive coding, and apply a smoothing filter selected from the same filtering table, e.g., TABLE 7, used during encoding, based on the block size and the intra-prediction mode (908). In this manner, video decoder 30 may not need to make any determinations regarding filtering options other than selecting a filter from the filter table.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

The invention claimed is:

1. A method of coding video data, the method comprising:
    determining a block size associated with a current block of video data, the block size determined from a plurality of block sizes including a 4×4 block size, an 8×8 block size, a 16×16 block size, and a 32×32 block size;
    determining an intra-prediction coding mode associated with the current block of video data, the intra-prediction coding mode determined from a plurality of intra-prediction coding modes including a horizontal mode, a vertical mode, a planar mode, a DC mode, and a plurality of diagonal modes, including an upper-left diagonal mode, an upper right diagonal mode, a down-left diagonal mode and wherein the plurality of diagonal modes include a plurality of modes that are directly adjacent to the horizontal mode or the vertical mode;
    determining based on the block size and intra-prediction coding mode a filtering decision for whether to apply a filter to prediction samples used to predict the current block, the determining comprising:
        if the block size is the 4×4 block size, determining the filter decision to be that no filtering is to be applied to prediction samples used to predict the current block for any of the plurality of intra-prediction coding modes,
        if the block size is the 8×8 block size, determining the filter decision to be that prediction samples used to predict the current block to be are filtered only if the coding mode is the planar mode, the upper-left diagonal mode, the upper-right diagonal mode and the down-left diagonal mode,
        if the block size is the 16×16 block size, determining the filter decision to be that prediction samples used to predict the current block are to be filtered if the coding mode is the planar mode, or if the coding mode is any other of the plurality of intra-prediction coding modes except for the horizontal mode, the vertical mode, the DC mode, and the modes directly adjacent to the horizontal mode or vertical mode, or
        if the block size is the 32×32 block size, determining the filter decision to be that prediction samples used to predict the current block are to be filtered if the coding mode is the planar mode, or if the coding mode is any other of the plurality of the plurality of prediction coding modes except for the horizontal mode, the vertical mode, and the DC mode; and
    intra-predictive coding the current block, wherein intra-predictive coding the current block comprises using the determined filtering decision to either filter or not filter the pixels used to predict the current block.

2. The method of claim 1, wherein determining the filtering decision comprises selecting from a first filtering decision table based on the block size and the coding mode.

3. The method of claim 1, wherein determining the filtering decision comprises:
   selecting from a first table based on the block size and the coding mode, when the block size is smaller than a threshold block size; and
   determining whether to select from the first table or a second table based on the block size and the coding mode, when the block size is equal to or greater than a threshold block size.

4. The method of claim 3, further comprising:
   selecting a filter decision from a first filter table or a second filter table;
   using the selected filter decision to filter the pixels used to predict the current block;
   evaluating a first result of the application of the filter from the first filter table and a second result of the application of the filter from the second filter table to determine which yields better results; and
   selecting the filtering decision from the first filter table or the second filter table based on the determination.

5. The method of claim 4, further comprising encoding a filtering indication when the selected filter is selected from the second filter table.

6. The method of claim 4, wherein the first filter table and the second filter table each comprise entries corresponding to different combinations of block sizes and coding modes, and wherein each of the entries comprises a filter selected from a set of filters.

7. The method of claim 6, wherein the set of filters comprises at least two filters, and wherein one of the filters comprises an all-pass filter.

8. The method of claim 1, wherein intra-predictive coding the current block comprises intra-predictive decoding the current block, wherein the current block comprises a block of video data encoded using intra-predictive coding, the method further comprising:
   determining whether the encoded current block includes a filtering indication,
   wherein determining the filter decision comprises determining the filter decision based on the block size, the coding mode, and the encoded filtering indication.

9. The method of claim 1, wherein the current block comprises a prediction unit coded according to Short-Distance Intra Prediction (SDIP).

10. The method of claim 9, further comprising:
    determining a dimension associated with the current block; and
    determining the block size based on the dimension using a set of dimension-determination rules.

11. An apparatus for coding video data, the apparatus comprising:
    a memory configured to store video data; and
    a processor configured to:
        determine a block size associated with a current block of video data, the block size determined from a plurality of block sizes including a 4×4 block size, an 8×8 block size, a 16×16 block size, and a 32×32 block size,
        determine an intra-prediction coding mode associated with the current block of video data, the intra-prediction coding mode determined from a plurality of intra-prediction coding modes including a horizontal mode, a vertical mode, a planar mode, a DC mode, and a plurality of diagonal modes, including an upper-left diagonal mode, an upper right diagonal mode, a down-left diagonal mode and wherein the plurality of diagonal modes include a plurality of modes that are directly adjacent to the horizontal mode or the vertical mode,
        determine based on the block size and intra-prediction coding mode a filtering decision for whether to apply a filter to prediction samples used to predict the current block, to determine the processor is further configured to:
            if the block size is the 4×4 block size, determine the filter decision to be that no filtering is to be applied to prediction samples used to predict the current block for any of the plurality of intra-prediction coding modes,
            if the block size is the 8×8 block size, determine the filter decision to be that prediction samples used to predict the current block to be are filtered only if the coding mode is the planar mode, the upper-left diagonal mode, the upper-right diagonal mode and the down-left diagonal mode,
            if the block size is the 16×16 block size, determine the filter decision to be that prediction samples used to predict the current block are to be filtered if the coding mode is the planar mode, or if the coding mode is any other of the plurality of intra-prediction coding modes except for the horizontal mode, the vertical mode, the DC mode, and the modes directly adjacent to the horizontal mode or vertical mode, or
            if the block size is the 32×32 block size, determine the filter decision to be that prediction samples used to predict the current block are to be filtered if the coding mode is the planar mode, or if the coding mode is any other of the plurality of the plurality of prediction coding modes except for the horizontal mode, the vertical mode, and the DC mode, and
        intra-predictive code the current block, wherein intra-predictive coding the current block comprises using the determined filtering decision to either filter or not filter the pixels used to predict the current block.

12. The apparatus of claim 11, wherein to determine the filtering decision, the processor is configured to select from a first filter decision table based on the block size and the encoding mode.

13. The apparatus of claim 11, wherein to determine the filtering decision, the processor is further configured to:
    select from a first filter table based on the block size and the coding mode, when the block size is smaller than a threshold block size; and
    determine whether to select from the first filter table or a second filter table based on the block size and the coding mode, when the block size is equal to or greater than a threshold block size.

14. The apparatus of claim 13, wherein the processor is further configured to:
    select a filter decision from a first filter table or a second filter table;
    using the selected filter decision to filter the pixels used to predict the current block;
    evaluate a first result of the application of the filter from the first filter table and a second result of the application of the filter from the second filter table to determine which yields better results; and
    select the filter from the first filter table or the second filter table based on the determination.

15. The apparatus of claim 14, wherein the processor is further configured to encode a filtering indication when the selected filter is selected from the second filter table.

16. The apparatus of claim 13 further comprising a memory configured to store the first filter table and the second filter table.

17. The apparatus of claim 13, wherein the first filter table and the second filter table each comprise entries corresponding to different combinations of block sizes and coding modes, and wherein each of the entries comprises a filter selected from a set of filters.

18. The apparatus of claim 17, wherein the set of filters comprises at least two filters, and wherein one of the filters comprises an all-pass filter.

19. The apparatus of claim 11 wherein the apparatus comprises a video decoder, wherein the current block comprises a block of video data encoded using intra-predictive coding, the processor is further configured to:
determine whether the encoded current block includes a filtering indication,
wherein to determine the filter the processor is further configured to determine the filter decision based on the block size, the coding mode, and the encoded filtering indication.

20. The apparatus of claim 11, wherein the current block comprises a prediction unit coded according to Short-Distance Intra Prediction (SDIP).

21. The apparatus of claim 20, wherein the processor is further configured to:
determine a dimension associated with the current block; and
determine the block size based on the dimension using a set of dimension-determination rules.

22. An apparatus for encoding video data, the apparatus comprising:
means for determining a block size associated with a current block of video data, the block size determined from a plurality of block sizes including a 4×4 block size, an 8×8 block size, a 16×16 block size, and a 32×32 block size;
means for determining an intra-prediction coding mode associated with the current block of video data, the intra-prediction coding mode determined from a plurality of intra-prediction coding modes including a horizontal mode, a vertical mode, a planar mode, a DC mode, and a plurality of diagonal modes, including an upper-left diagonal mode, an upper right diagonal mode, a down-left diagonal mode and wherein the plurality of diagonal modes include a plurality of modes that are directly adjacent to the horizontal mode or the vertical mode;
means for determining based on the block size and intra-prediction coding mode a filtering decision for whether to apply a filter to prediction samples used to predict the current block, the means for determining comprising:
if the block size is the 4×4 block size, means for determining the filter decision to be that no filtering is to be applied to prediction samples used to predict the current block for any of the plurality of intra-prediction coding modes,
if the block size is the 8×8 block size, means for determining the filter decision to be that prediction samples used to predict the current block to be are filtered only if the coding mode is the planar mode, the upper-left diagonal mode, the upper-right diagonal mode and the down-left diagonal mode,
if the block size is the 16×16 block size, means for determining the filter decision to be that prediction samples used to predict the current block are to be filtered if the coding mode is the planar mode, or if the coding mode is any other of the plurality of intra-prediction coding modes except for the horizontal mode, the vertical mode, the DC mode, and the modes directly adjacent to the horizontal mode or vertical mode, or
if the block size is the 32×32 block size, means for determining the filter decision to be that prediction samples used to predict the current block are to be filtered if the coding mode is the planar mode, or if the coding mode is any other of the plurality of the plurality of prediction coding modes except for the horizontal mode, the vertical mode, and the DC mode; and
means for intra-predictive encoding the current block, wherein intra-predictive encoding the current block comprises using the determined filtering decision to either filter or not filter the pixels used to predict the current block.

23. The apparatus of claim 22, wherein the means for determining the filtering decision comprises means for selecting from a first filter table based on the block size and the coding mode.

24. The apparatus of claim 22, wherein the means for determining the filtering decision comprises:
means for selecting from a first filter table based on the block size and the coding mode, when the block size is smaller than a threshold block size; and
means for determining whether to select from the first filter table or a second filter table based on the block size and the coding mode, when the block size is equal to or greater than a threshold block size.

25. The apparatus of claim 22, wherein the means for determining the filtering decision comprises:
means for selecting from a first table based on the block size and the coding mode, when the block size is smaller than a threshold block size; and
means for determining whether to select from the first table or a second table, when the block size is equal to or greater than a threshold block size.

26. The apparatus of claim 25, further comprising:
means for select a filter decision from a first filter table or the second filter table;
means for using the selected filter decision to filter the pixels used to predict the current block;
means for evaluating a first result of the application of the filter from the first filter table and a second result of the application of the filter from the second filter table to determine which yields better results; and
means for selecting the filter decision from the first filter table or the second filter table based on the determination.

27. The apparatus of claim 26, further comprising means for encoding a filtering indication when the selected filter is selected from the second filter table.

28. The apparatus of claim 26, wherein the first filter table and the second filter table each comprise entries corresponding to different combinations of block sizes and coding modes, and wherein each of the entries comprises a filter selected from a set of filters.

29. The apparatus of claim 28, wherein the set of filters comprises at least two filters, and wherein one of the filters comprises an all-pass filter.

30. The apparatus of claim 25, further comprising means for storing the first filter table and the second filter table.

31. The apparatus of claim 22, wherein the apparatus comprises a video decoder, wherein the current block comprises a block of video data encoded using intra-predictive coding, the apparatus further comprising:

means for determining whether the encoded current block includes a filtering indication, wherein the means for determining the filter decision comprises means for determining the filter decision based on the block size, the coding mode, and the encoded filtering indication.

32. The apparatus of claim 22, wherein the current block comprises a prediction unit coded according to Short-Distance Intra Prediction (SDIP).

33. The apparatus of claim 32, further comprising:
means for determining a dimension associated with the current block; and
means for determining the block size based on the dimension using a set of dimension-determination rules.

34. A non-transitory computer-readable storage medium
determine a block size associated with a current block of video data, the block size determined from a plurality of block sizes including a 4×4 block size, an 8×8 block size, a 16×16 block size, and a 32×32 block size;
determine an intra-prediction coding mode associated with the current block of video data, the intra-prediction coding mode determined from a plurality of intra-prediction coding modes including a horizontal mode, a vertical mode, a planar mode, a DC mode, and a plurality of diagonal modes, including an upper-left diagonal mode, an upper right diagonal mode, a down-left diagonal mode and wherein the plurality of diagonal modes include a plurality of modes that are directly adjacent to the horizontal mode or the vertical mode;
determine based on the block size and intra-prediction coding mode a filtering decision for whether to apply a filter to prediction samples used to predict the current block, to determine the instructions further cause the processor to:
if the block size is the 4×4 block size, determine the filter decision to be that no filtering is to be applied to prediction samples used to predict the current block for any of the plurality of intra-prediction coding modes,
if the block size is the 8×8 block size, determine the filter decision to be that prediction samples used to predict the current block to be are filtered only if the coding mode is the planar mode, the upper-left diagonal mode, the upper-right diagonal mode and the down-left diagonal mode,
if the block size is the 16×16 block size, determine the filter decision to be that prediction samples used to predict the current block are to be filtered if the coding mode is the planar mode, or if the coding mode is any other of the plurality of intra-prediction coding modes except for the horizontal mode, the vertical mode, the DC mode, and the modes directly adjacent to the horizontal mode or vertical mode, or
if the block size is the 32×32 block size, determine the filter decision to be that prediction samples used to predict the current block are to be filtered if the coding mode is the planar mode, or if the coding mode is any other of the plurality of the plurality of prediction coding modes except for the horizontal mode, the vertical mode, and the DC mode; and
intra-predictive code the current block, wherein intra-predictive coding the current block comprises using the determined filtering decision to either filter or not filter the pixels used to predict the current block.

35. The non-transitory computer-readable storage medium of claim 34, wherein the instructions that cause the processor to determine the filtering decision comprise instructions that cause the processor to select from a first filter table based on the block size and the coding mode.

36. The non-transitory computer-readable storage medium of claim 34, wherein the instructions that cause the processor to identify the filtering decision comprise instructions that cause the processor to:
select from a first filter table based on the block size and the coding mode, when the block size is smaller than a threshold block size; and
determine whether to select from the first filter table or a second filter table based on the block size and the coding mode, when the block size is equal to or greater than a threshold block size.

37. The non-transitory computer-readable storage medium of claim 36, wherein the instructions further comprise instructions that cause the processor to:
determine a filter decision from the first filter table or the second filter table;
use the selected filter decision to filter the pixels used to predict the current block;
evaluate a first result of the application of the filter from the first filter table and a second result of the application of the filter from the second filter table to determine which yields better results; and
select the filter decision from the first filter table or the second filter table based on the determination.

38. The "non-transitory computer-readable storage medium of claim 37, further comprising instructions that cause the processor to encode a filtering indication when the selected filter is selected from the second filter table.

39. The non-transitory computer-readable storage medium of claim 37, wherein the first filter table and the second filter table each comprise entries corresponding to different combinations of block sizes and coding modes, and wherein each of the entries comprises a filter selected from a set of filters.

40. The non-transitory computer-readable storage medium of claim 39, wherein the set of filters comprises at least two filters, and wherein one of the filters comprises an all-pass filter.

41. The non-transitory computer-readable storage medium of claim 34, wherein the instructions that cause the processor to decode the current block, wherein the current block comprises a block of video data encoded using intra-predictive coding, further comprising instructions that cause the processor to:
determine whether the encoded current block includes a filtering indication, wherein the instruction to determine the filter comprise instruction to determine the filter decision based on the block size, the coding mode, and the encoded filtering indication.

42. The non-transitory computer-readable storage medium of claim 34, wherein the current block comprises a prediction unit coded according to Short-Distance Intra Prediction (SDIP).

43. The non-transitory computer-readable storage medium of claim 42, further comprising instructions that cause the processor to:
determine a dimension associated with the current block; and
determine the block size based on the dimension using a set of dimension-determination rules.

* * * * *

UNITED STATES PATENT AND TRADEMARK OFFICE
CERTIFICATE OF CORRECTION

PATENT NO. : 9,008,175 B2
APPLICATION NO. : 13/248968
DATED : April 14, 2015
INVENTOR(S) : Geert Van der Auwera It is certified that error appears in the above-identified patent and that said Letters Patent is hereby corrected as shown below:

In the claims

Claim 1, column 32, line 42, "the current block to be are filtered" should be changed to -- the current block are to be filtered --

Claim 11, column 34, line 17, "the current block to be are filtered" should be changed to -- the current block are to be filtered --

Claim 22, column 35, line 59, "the current block to be are filtered" should be changed to -- the current block are to be filtered --

Claim 34, column 37, line 43, "the current block to be are filtered" should be changed to -- the current block are to be filtered --

Signed and Sealed this
Seventh Day of June, 2016

Michelle K. Lee
*Director of the United States Patent and Trademark Office*